(12) United States Patent
Pankratov et al.

(10) Patent No.: US 12,441,560 B2
(45) Date of Patent: Oct. 14, 2025

(54) MATERIAL HANDLING SYSTEM WITH PALLETIZATION RE-PLANNING

(71) Applicant: Symbotic LLC, Wilmington, MA (US)

(72) Inventors: Kirill Pankratov, Wilmington, MA (US); Ilya Erokhin, Wilmington, MA (US); Oleksandr Muzychko, Wilmington, MA (US); Rick Youping Huang, Wilmington, MA (US)

(73) Assignee: Symbotic LLC, Wilmington, MA (US)

( * ) Notice: Subject to any disclaimer, the term of this patent is extended or adjusted under 35 U.S.C. 154(b) by 168 days.

(21) Appl. No.: 18/353,551

(22) Filed: Jul. 17, 2023

(65) Prior Publication Data

US 2024/0017941 A1    Jan. 18, 2024

Related U.S. Application Data

(60) Provisional application No. 63/368,710, filed on Jul. 18, 2022.

(51) Int. Cl.
*B65G 57/24* (2006.01)
*B65G 1/16* (2006.01)
*B65G 43/08* (2006.01)

(52) U.S. Cl.
CPC ............ *B65G 57/24* (2013.01); *B65G 1/16* (2013.01); *B65G 43/08* (2013.01); *B65G 2201/0267* (2013.01)

(58) Field of Classification Search
CPC .......... B65G 57/24; B65G 1/16; B65G 43/08; B65G 2201/0267; B65G 1/1378;

(Continued)

(56) References Cited

U.S. PATENT DOCUMENTS 5,908,283 A * 6/1999 Huang .................. G06Q 10/043
                                                    414/21
7,266,422 B1 * 9/2007 DeMotte ................ B25J 9/1687
                                                    414/801

(Continued)

OTHER PUBLICATIONS

International Search Report for application No. PCT/US2023/070390 dated Nov. 29, 2023.

*Primary Examiner* — Lynn E Schwenning
(74) *Attorney, Agent, or Firm* — Perman & Green, LLP

(57) ABSTRACT

A material handling system for handling, placing packages onto pallets destined for an order store, the material handling system comprising, a storage array with storage spaces for holding packages therein, an automated package transport system communicably connected to the storage array for storing packages within the storage spaces of the storage array and retrieving packages from the storage spaces of the storage array, an automated palletizer for placing mixed packages onto a pallet to form a pallet load of mixed packages, the automated palletizer is communicably connected to the automated package transport system which provides individual packages from the storage array to the automated palletizer for forming the pallet load of mixed packages, the pallet load of mixed packages including more than one composite layers of mixed packages, a controller operably connected to the automated palletizer, the controller being programmed with a pallet load generator with an initial pallet load.

36 Claims, 19 Drawing Sheets

(58) Field of Classification Search
CPC ........ B65G 57/03; B65G 61/00; G06Q 10/08;
G06Q 10/043; G05B 13/0215
See application file for complete search history.

(56) References Cited

U.S. PATENT DOCUMENTS

| | | | |
|---|---|---|---|
| 10,894,676 B2* | 1/2021 | Turpin | B65G 59/02 |
| 11,305,430 B2* | 4/2022 | Fu | B25J 9/1687 |
| 2010/0228385 A1 | 9/2010 | Beck et al. | |
| 2010/0249988 A1* | 9/2010 | Baldes | B65G 61/00 |
| | | | 700/217 |
| 2015/0166272 A1* | 6/2015 | Pankratov | G06Q 10/08 |
| | | | 700/217 |
| 2017/0185959 A1 | 6/2017 | Meurer | |
| 2019/0382212 A1* | 12/2019 | Hansl | B65G 61/00 |
| 2021/0139259 A1 | 5/2021 | Uriarte | |

\* cited by examiner

MATERIAL HANDLING SYSTEM WITH PALLETIZATION RE-PLANNING

CROSS-REFERENCE TO RELATED APPLICATIONS

This application is a non-provisional of and claims the benefit of U.S. provisional patent application No. 63/368,710 filed on Jul. 18, 2022, the disclosure of which is incorporated herein by reference in its entirety.

BACKGROUND

1. Field

The present disclosure generally relates to material handling systems, such as automated storage and retrieval systems, and more particularly, to automated palletizing.

2. Brief Description of Related Developments

Warehousing and logistics operations are employing ever-increasing amounts of automation for storage and retrieval operations. Generally, the storage and retrieval operations produce pallet loads that are built in accordance with one or more customer orders, where the pallet loads are shipped to a retail store, business customer, or another warehouse. The pallet load generally includes boxes of packages having generally cuboid shapes, that are collected together (e.g., via the retrieval operations) and are arranged on a pallet(s) for transportation from a staging area the warehouse or logistic center to a truck (or other vehicle) to be received by the retail store, business customer, or another warehouse. As may be understood, building pallets remains a labor-intensive and time-consuming operation and an aim of the above noted automation is to automate the process of palletizing the boxes retrieved from storage with robotics and other warehouse machinery.

Generally, pallet load plans (e.g., lists of positions and orientations of boxes on a pallet that make a stable and transportable arrangement of boxes) are generated such that palletizing robots can build a pallet load. Boxes transported to a palletizing robot for building a pallet load in accordance with the pallet load plan are transported to the palletizing robot in a strict sequence defined by the pallet load plans where the transport of the boxes occurs using different types of transport machinery (e.g., mini-load cranes, shuttles or mobile robots picking inventory from storage; vertical lifts or conveyors; and horizontal conveyors, sorters, or mergers that deliver the boxes to a palletization area) between which the boxes are transferred for delivery to the palletizing robot. At every step of the transport process, the boxes are to arrive at their destinations within a relative small window of time, in the strict sequence.

As may be understood, the high cost of automation, generally commands maximizing throughput of the warehouse/logistics facility and the palletizing of the boxes (e.g., boxes placed on a pallet per unit of time). A delay in the delivery of boxes to the palletizer may disrupt operation (e.g., lower throughput) of the warehouse storage and retrieval system, where a palletizer has to wait for a particular box in a sequence. In some instances (e.g., such as where there is a mechanical or electrical problem in the warehouse/logistics facility causing failure of machinery; closure of parts of the warehouse/logistics facility for maintenance; inventory accounting errors, computer malfunctions, etc.) boxes may be prevented from being delivered in sequence, and within the desired windows of time, which disrupts the palletization process. Where there is failure of delivery of one or more boxes in a sequence of boxes to a palletizer, the sequence (e.g., defined by the pallet load plan) of boxes placed on the pallet cannot be arbitrarily changed, and other boxes generally cannot be placed on a missing box, as the absence of the box implies a hole or void in the pallet that may not stably support other boxes.

Conventionally, missing boxes in the sequence of boxes delivered to a palletizer are mitigated in ways that decrease palletizing efficiency (e.g., reduce throughput) and/or reduce the built quality of the pallet load. Examples of missing box mitigation include delivery of an extra box to the palletizer, where the extra box may not be part of the customer order but has similar dimensions to the missing box; stoppage of the automated palletizer in favor of manual palletization of a remainder of the pallet load; and stoppage of the automated palletizer for the pallet being built, and the creation of a new pallet load plan for the remainder of the pallet, resulting in an additional pallet being built.

BRIEF DESCRIPTION OF THE DRAWINGS

The foregoing aspects and other features of the present disclosure are explained in the following description, taken in connection with the accompanying drawings, wherein.

DETAILED DESCRIPTION

Figure 1:
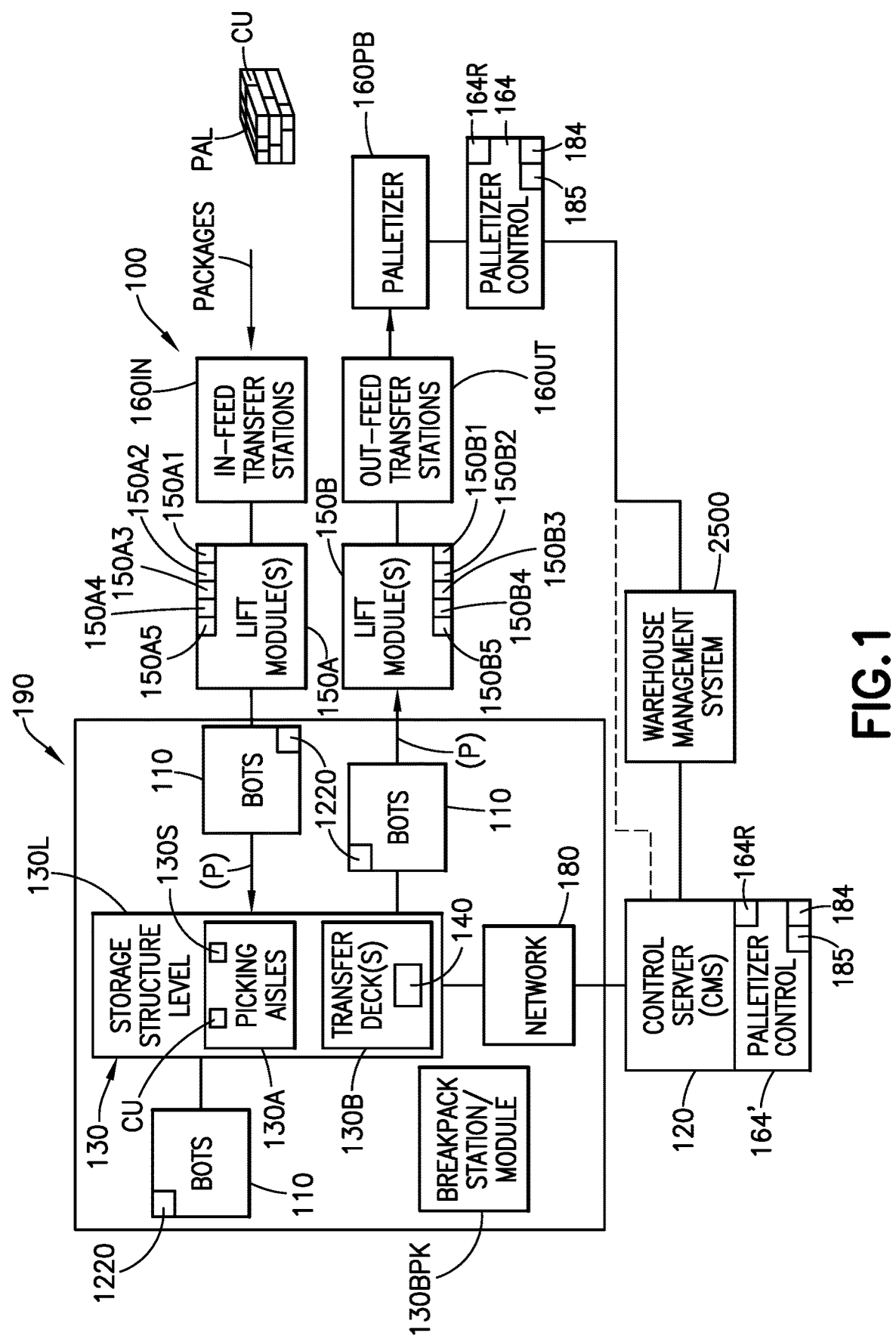
FIG. 1 is a schematic illustration of a material handling system in accordance with aspects of the present disclosure.

FIG. 1 illustrates an exemplary automated storage and retrieval system (also referred to herein as a material handling system) 100 for handling and placing packages onto pallets destined for an order store (e.g., retail store, business customer, or another warehouse) in accordance with aspects of the present disclosure. Although the aspects of the present disclosure will be described with reference to the drawings, it should be understood that the aspects of the present disclosure could be embodied in many forms. In addition, any suitable size, shape or type of elements or materials could be used.

In accordance with the aspects of the present disclosure, the automated storage and retrieval system 100 in FIG. 1 may be disposed in a retail distribution center or warehouse, for example, to fulfill orders received from retail stores for replenishment goods shipped in cases, packages, and or parcels. The terms case, package, and parcel are used interchangeably herein and may be any container that may be used for shipping and may be filled with case or more product units by the producer. Case or cases as used herein means case, package or parcel units not stored in trays, on totes, etc. (e.g. uncontained). It is noted that the case units CU (also referred to herein as mixed cases, cases, packages, boxes, and shipping units) may include cases of items/unit (e.g. case of soup cans, boxes of cereal, etc.) or individual item/units that are adapted to be taken off of or placed on a pallet. In accordance with the exemplary embodiments, shipping cases or case units (e.g. cartons, barrels, boxes, crates, jugs, shrink wrapped trays or groups or any other suitable device for holding case units) may have variable sizes and may be used to hold case units in shipping and may be configured so they are capable of being palletized for shipping. It is noted that when, for example, incoming bundles or pallets (e.g. from manufacturers or suppliers of case units arrive at the storage and retrieval system for replenishment of the automated storage and retrieval system 100, the content of each pallet may be uniform (e.g. each pallet holds a predetermined number of the same item-one pallet holds soup and another pallet holds cereal). As may be realized, the cases of such pallet load may be substantially similar or in other words, homogenous cases (e.g. similar dimensions), and may have the same SKU (otherwise, as noted before the pallets may be "rainbow" pallets having layers formed of homogeneous cases). As pallets leave the storage and retrieval system, with cases filling replenishment orders, the pallets may contain any suitable number and combination of different case units (e.g. each pallet may hold different types of case units-a pallet holds a combination of canned soup, cereal, beverage packs, cosmetics and household cleaners). The cases combined onto a single pallet may have different dimensions and/or different SKU's.

Figure 3A:
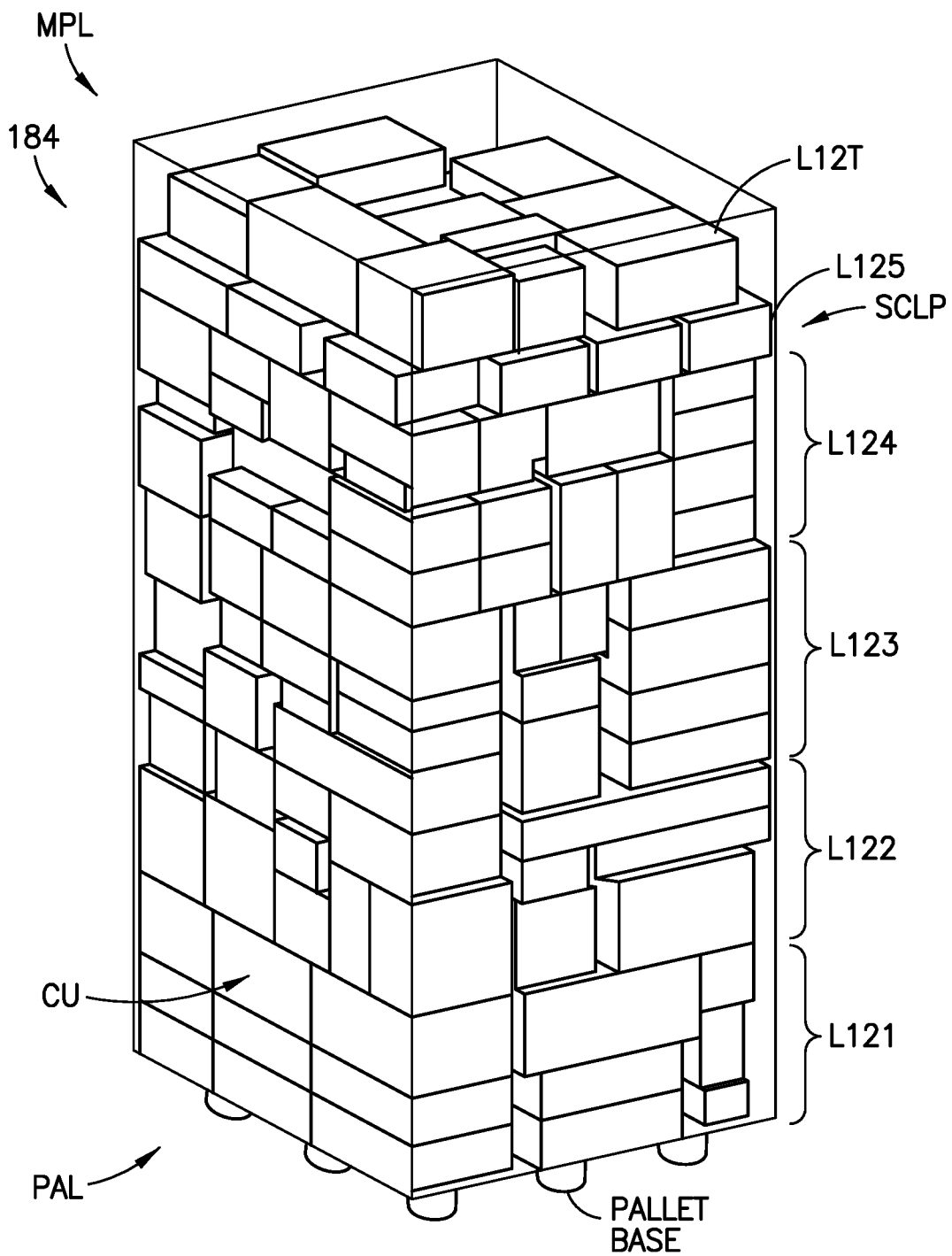
FIG. 3A is a schematic illustration of a pallet load generated with the material handling system of FIG. 1 in accordance with aspects of the present disclosure.
Figure 3B:
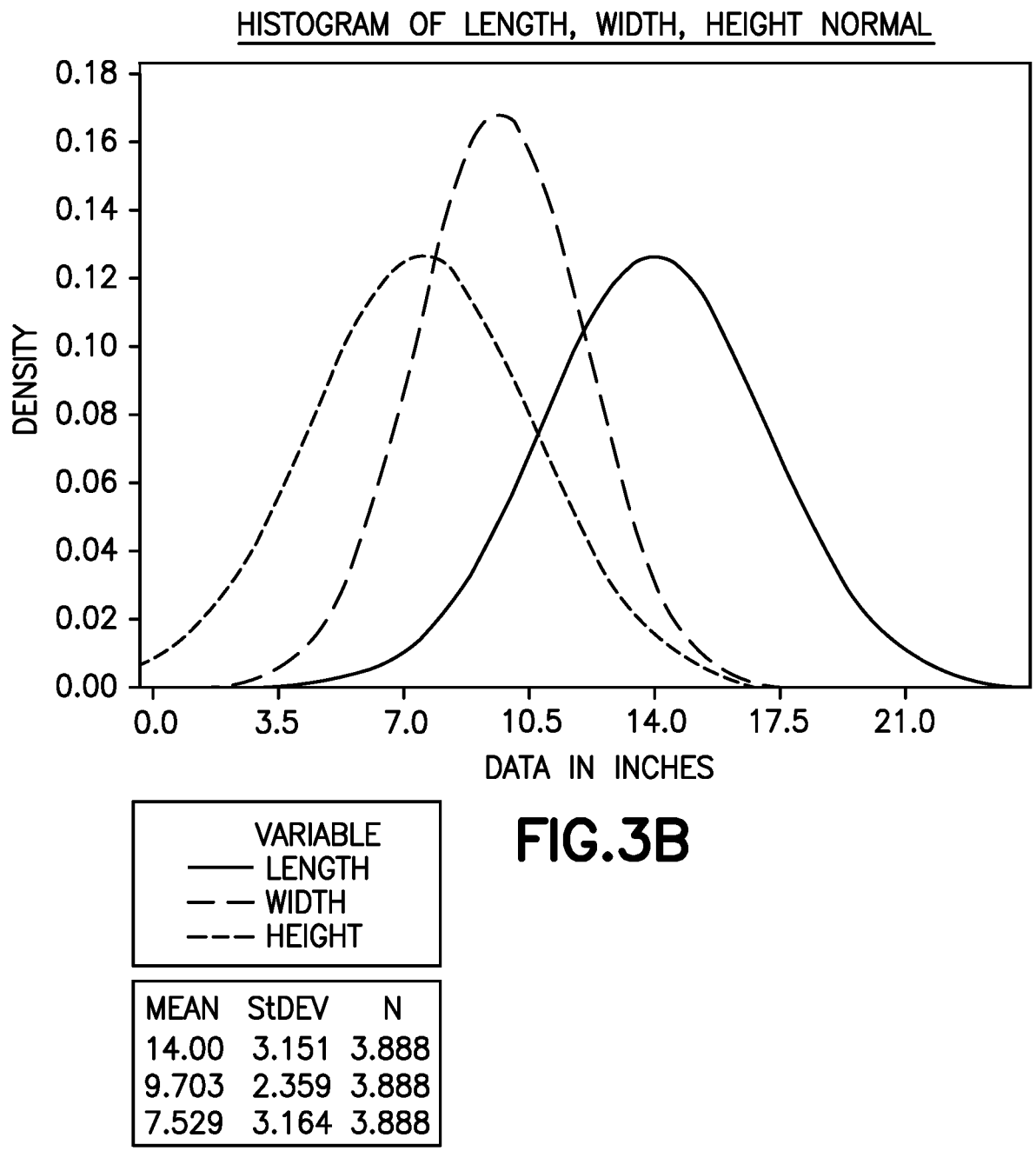
FIG. 3B is a histogram of mixed case characteristics for the pallet load of FIG. 3A in accordance with aspects of the present disclosure.

Referring also to FIGS. 3A and 3B, there is shown a schematic perspective view of an exemplary mixed case pallet load PAL built in accordance with aspects of the present disclosure. It is noted that when, for example, incoming bundles or pallets (e.g. from manufacturers or suppliers of case units arrive at the storage and retrieval system for replenishment of the automated storage and retrieval system 100, the content of each pallet may be uniform (e.g. each pallet holds a predetermined number of the same item-one pallet holds soup and another pallet holds cereal). As may be realized, the cases of such pallet load may be substantially similar or in other words, homogenous cases (e.g. similar dimensions), and may have the same SKU (otherwise, as noted before the pallets may be "rainbow" pallets having layers formed of homogeneous cases). The pallet load PAL shown in FIG. 3A may be referred to as a level layer pallet, wherein the pallet is built by placing cases one case layer L121-L125, L12T at a time (cases may be placed individually or in partial or whole layers as noted above until the level layer L121-L125, L12T is complete before proceeding to the next level layer L121-L125, L12T. The pallet load PAL has a highly heterogeneous case order where the degree of heterogeneity that may be encountered when building mixed case pallets, may be better understood from the curves shown in FIG. 3B. FIG. 3B is a graph illustrating the variation of case dimensions (e.g. length, height and width) within a representative population of cases such as may be found in the storage and retrieval system and used to generate the mixed case pallets according to customer replenishment orders. As may be realized, the orders may result in mixed case pallets including many cases with dimensions from disparate portions of the dimension spectrum illustrated in FIG. 3B. In one aspect, the pallet load PAL (or a portion thereof) may be loaded with cases in columns or stacked in layers to a maximum allowable pallet height, such as for example, 48 inches (including a height of the pallet base) for a standard short pallet or 96 inches (including the height of the pallet base) for a standard tall pallet (in other aspects, the pallets may be taller or shorter so as to have a non-standard height). Cases within layers rest on support surfaces of the underlying (e.g., inferior) case layers within the pallet load PAL, and conversely the underlying case layer surfaces delimit the cases in layers (e.g., superior/superposed layers) that may be placed above. Relaxation of the limits on sizes of under cases has a detrimental and undesirable effect on pallet stability. The aspects of the present disclosure overcome stability problems of pallets as will be described further below.

The highly heterogeneous pallet loads PAL may be formed with a pallet planner arrangement (similar to that described in U.S. Pat. No. 8,965,559 issued on Feb. 24, 2015 and titled "Pallet Building System", the disclosure of which is incorporated herein by reference in its entirety) that is configured to plan structure of the pallet load and separate sequencing of case units for the pallet load. The pallet planner (also referred to as a pallet load generator 164, 164') generates a planned initial pallet structure (i.e., the mixed case arrangement plan) 184 including boundary conditions and constraints imposed by pallet size, case characteristics, packing efficiency according to planning system or process in a manner similar to that described in U.S. Pat. No. 8,965,559 (previously incorporated herein by reference in its entirety). As may be realized, in automated warehouse systems, some cases units (e.g., "missing cases/case units" also referred to herein as "scratched cases/case units") in the initial pallet load plan 184 are not delivered in a desired sequence (or at all) to, for example, the palletizer 160PB, leaving an "empty space" in the pre-computed pallet load PAL, defined by the initial pallet load plan 184. It is expected that a significant majority of pallet builds will have more than one scratched case, and it is likely that multiple scratched cases may appear in pallet builds with at least one scratched case. It is expected that distribution of pallets with scratched cases follows a similar distribution as that shown in FIG. 3B. In other words, it is expected that presence of a scratched case will result in a failed pallet build without mitigation. The aspects of the present disclosure provide for mitigation of the missing cases with what may be referred to for description as minimal modifications to a pallet load plan/structure for a pallet being built in real time. These minimal modifications or variances allow the, at least partially, re-planned pallet load to be stably built without the undelivered cases, and generally preserving the pallet shape of the original or initial pallet load plan. It is noted that, presence of the void/scratched case within the initial pallet build will cause failure of the pallet build due to instability presented by the void. Thus, though referred to as minimum modification, the mitigation effected by the modification is strictly required for a successful pallet build. The minimal modifications to the initial pallet load plan 184 are determined prior to placement of the affected case units (e.g., case units in the same stack or layer as a missing case) in the sequence for palletizing as described herein. For example, with reference to FIGS. 4 and 5, a case unit CU may be considered "in sequence for palletizing," once the case unit is placed on the outbound conveyor 160CB or on the pallet and the place of the case unit in the pallet placement sequence cannot be changed (although the placement position of the case may be changed as described herein, so long as the case is placed in the pallet placement sequence).

As described herein, the minimal modifications to a pallet load plan/structure for the pallet being built in real time effect stability of the stacks/layers of case units of the pallet and the stability of the pallet load during build, transport, and depalletization, even without the undelivered cases. Stability of stacks of case units refers to the ability of the stacks of cases in the pallet build to remain intact and upright, i.e., stable against expected forces such as those generated by the palletizer or other cases as the palletizer or other cases contact those cases already placed when, for example, the palletizer places a case to a pallet stack, withdraws the palletizer from underneath the case being placed, and frictional forces between the case being placed and those cases already in the stack. The stability of a pallet load refers to the ability of the pallet load to remain intact and upright, i.e., stable against forces such as acceleration, deceleration during transport, forklift handling movements, depalletization, etc. experienced during the distribution cycle.

The minimal modifications to the (initial) pallet load plan/structure for the pallet being built include, but are not limited to: moving and/or rearranging cases adjacent the space designated for the missing case (e.g., the designated space) in such a way as to encroach in the designated space so as to reduce the empty space (e.g., arising from the missing case) within the pallet load PAL; substitutions of missing cases with other cases of similar dimensions but with a higher sequence number (e.g., cases that are intended to be placed on the pallet after the missing case); and swapping of the pallet layer which includes the empty space corresponding to the missing case (e.g., the missing case layer) with another pallet player intended to be placed on the pallet after the missing case layer so that the empty space occurs later in the palletization sequence. Here, the minimal modifications to the pallet load plan/structure for the pallet being built in accordance with the aspects of the present disclosure may provide for maximization of storage and retrieval throughput, as well as uninterrupted operations of the palletizer 160PB that has less than 100% reliability of supply of cases to the palletizer. As may be realized, the value of minimizing modifications to the pallet load plan 184 can be understood in preserving the delivery sequence of remaining case units to the palletizer 160PB, where the rate of palletizing is maintained. The aspects of the present disclosure provide pallet load re-plan(s) 185, as described herein, that are configured so as to substantially maintain the rate of palletizing, pallet/layer/case stack stability, and unobstructed case unit placement on a pallet/in a pallet layer (e.g., unobstructed by case units already placed on the pallet).

As shown in FIG. 3A, the pallet loads PAL described herein and generated in accordance with the aspects of the present disclosure are well-defined structures (e.g., defined by a respective pallet load plan) that include layers of case units of similar heights on top of other such layers, stacks of case units one on top of the other, composite layers having stacks of mixed case units in each layer, where whole stacks have substantially similar heights, and/or stacks of sublayers, occupying a portion of pallet footprints. At least one layer, in the complete and stable mixed case pallet structure, has a substantially flat deterministic top surface, so as to form a seating surface for interchangeably placing other of the mixed cases CU thereon, extending over a predetermined area of a pallet covered with multiple stacked mixed cases CU of the complete and stable mixed case pallet structure, or a free undeterministic surface forming a topmost boundary surface (see layer L12T) of the complete and stable mixed case pallet structure. With the pallet load PAL planned the pallet may be built with automated palletizers 160PB (see FIG. 1) where the planned cases are sequenced for pallet building in a manner substantially similar to that described in U.S. Pat. No. 11,305,430 issued on Apr. 19, 2022, the disclosure of which is incorporated herein by reference in its entirety, or in any other suitable manner.

It may be realized that generating sequencing that resolves how to build the complete and stable mixed case arrangement plan 184 is decoupled from the generation of the mixed case pallet arrangement plan 184. Decoupling the generation of the sequencing from the generation of the mixed case pallet load plan enables optimizing both the mixed case pallet arrangement plan 184 (e.g., to resolve fulfillment of mixed cases to an arrangement for an efficiently packed and stable pallet load PAL) and the solution sequence of mixed cases for the palletizer 160PB building the pallet load PAL to the mixed case arrangement plan 184 (e.g., to provide efficient (e.g., time optimal, or not waiting) with substantially continuous case placement action of the palletizer 160PB building the pallet load PAL, and robustness that compensates, in substantially real time, for sequencing anomalies that may occur in an extended series of retrieval transactions of the multilevel transport system 190 (also referred to as an automated package/case unit transport system) output in a manner substantially similar to that described in U.S. Pat. No. 11,305,430 issued on Apr. 19, 2022, the disclosure of which was previously incorporated herein by reference in its entirety.

Figure 2:
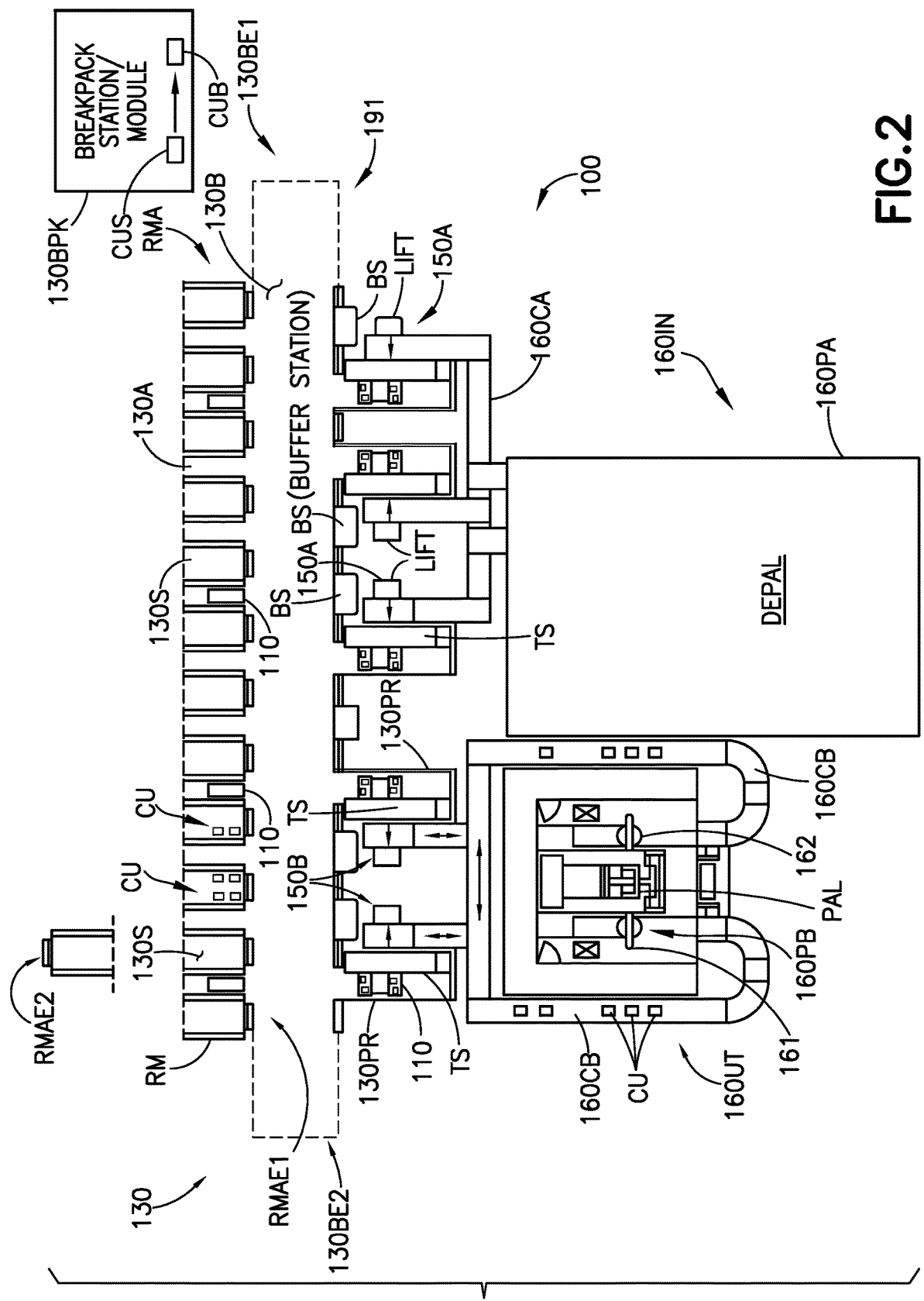
FIG. 2 is a schematic illustration of a portion of the material handling system of FIG. 1 in accordance with aspects of the present disclosure.

In accordance with aspects of the present disclosure, and referring to FIGS. 1 and 2, the system 100 may be generally configured to include an in-feed section, a storage and sortation section (e.g., multilevel transport system 190), and an output section. As will be described in greater detail below, the system 100 operating for example as a retail distribution center may serve to receive uniform pallet loads of cases, breakdown the pallet goods or disassociate the cases from the uniform pallet loads into independent case units CU handled individually by the system 100, retrieve and sort the different cases sought by each order into corresponding groups, and transport and assemble the corresponding groups of cases into what may be referred to as mixed case pallet loads (such as illustrated in FIG. 3A). The in-feed section may generally be capable of resolving the uniform pallet loads to individual cases, and transporting the cases via suitable transport, for input to the storage and sortation section. The storage and sortation section in turn may receive individual cases, store them in a storage area and retrieve desired cases individually in accordance with commands generated in accordance with orders entered into a warehouse management system 2500 for transport to the output section. The sorting and grouping of cases according to order may be performed in whole or in part by either the storage and retrieval section or the output section, or both, the boundary between being one of convenience for the description and the sorting and grouping being capable of being performed any number of ways as will be described further below. The intended result is that the output section assembles the appropriate group of ordered cases, that may be different in stock keeping unit (SKU), dimensions, etc. into mixed case pallet loads MPL (FIG. 3A). In the aspects of the present disclosure, the output section generates the pallet load in what may be referred to as a structured architecture of mixed case stacks. The structured architecture of the pallet load may be characterized as having several flat case layers L121-L125 (see FIG. 3A), at least one of which is formed of non-intersecting, free-standing and stable stacks of multiple mixed cases. The mixed case stacks of the given layer L121-L125, L12T have substantially the same height (see FIG. 3A), to form as may be realized substantially flat top and bottom surfaces of the given layer L121-L125, L12T, and may be sufficient in number (and collectively have a length and width) to cover the pallet area (e.g., where as many mixed case stacks as possible are placed on the pallet area without overhang), or any desired portion(s) of the pallet area, of a standard pallet having standard dimensions (in inches) of 40×48, 42×42, 48×48, 48×42, 40×40, 48×45, 44×44, 36×36, 48×36, or 48×20 (in other aspects, the pallets may have any suitable standard or non-standard dimensions).

The automated storage and retrieval system may be generally described as multilevel transport system 190 coupled to a palletizer 160PB. The palletizer 160PB is an automated palletizer configured to place mixed packages/case units CU onto a pallet for form a pallet load PAL of mixed packages. As described herein, the palletizer 160PB is communicably connected to the automated package transport system 190 which provides individual case units CU from a storage array (as described herein), of the material handling system 100, to the palletizer 160PB for forming a pallet load PAL.

In greater detail now, and with reference still to FIGS. 1 and 2, the storage and retrieval system 100 may be configured for installation in, for example, existing warehouse structures or adapted to new warehouse structures. As noted before the system 100 shown in FIGS. 1 and 2 is representative and may include for example, input stations 160IN (which include depalletizers 160PA and/or conveyors 160CA for transporting items to lift modules 150A for entry into storage) and output stations 160UT (which include palletizers 160PB, operator stations 160EP and/or conveyors 160CB for transporting case units from lift modules 150B for removal from storage), input and output vertical lift modules 150A, 150B (generally referred to as lift modules 150—it is noted that while input and output lift modules are shown, a single lift module may be used to both input and remove case units from the storage structure), a storage structure 130, and a number of autonomous rovers/vehicles or transport vehicles 110 (referred to herein as "bots"). It is noted that the depalletizers 160PA may be configured to remove case units from pallets so that the input station 160IN can transport the items to the lift modules 150 for input into the storage structure 130. The palletizers 160PB may be configured, as described herein, to place items removed from the storage structure 130 on pallets (FIG. 3A) for shipping.

At least the storage structure 130 (including one or more of the picking aisles 130A, storage spaces 130S (also referred to herein as storage locations) and transfer deck 130B of each different storage structure level 130L) and bots 110 may be collectively referred to herein as the multi-level transport system 190 (also referred to herein as an automated package transport system) that is communicably connected to the storage array (e.g., formed by the storage rack module array RMA) for storing case units CU within storage spaces 130S of the storage array and retrieving case unis CU from the storage spaces 130S of the storage array. Each level 130L of the multi-level transport system 190 having a corresponding asynchronous level transport system 191 (see FIG. 2, which includes, e.g., the bots 110, the picking aisles 130A, storage spaces 130S and transfer deck 130B of the respective level 130L), of mixed cases, that is separate and distinct from the level transport system 191 corresponding to each other level 130L of the multi-level transport system 190.

The lift modules 150 may be shown as reciprocating lifts in the figures; however, in other aspects the lift modules 150 may be any suitable vertically configured item handling device(s) such as, for example, an elevator (e.g., reciprocating lift) 150A1, 150B1, escalator 150A2, 150B2, angled conveyor belt 150A3, 150B3, unmanned aerial vehicle (e.g., a drone, quadcopter, multi-copter, etc.) 150A4, 150B4, and/or crane/hoist 150A5, 150B5. In some aspects, the lift modules 150A, 150B may form vertical sequencers in addition to the storage and retrieval engine 190 as described in U.S. patent application Ser. No. 16/444,592 filed on Jun. 18, 2019, the disclosure of which is incorporated herein by reference in its entirety).

The storage structure 130 may include multiple levels (e.g., storage levels 130L) of storage rack modules RMA (e.g., forming a storage array with storage space(s) 130S for holding case units CU therein) where each level 130L includes respective picking aisles 130A, and transfer decks 130B for transferring case units CU between any of the storage areas 130S of the storage structure 130 and a shelf of the lift module(s) 150A, 150B. The picking aisles 130A, and transfer decks 130B also allow the bots 110 to place case units CU into picking stock and to retrieve ordered case units CU. In alternate aspects, each storage level 130L may also include respective bot transfer stations TS for indirectly transferring case units between the bots 110 and the lifts 150A, 150B; while in other aspects the transfer of case units CU between the bots 110 and the lifts 150A, 150B may be a direct transfer.

The bots 110 may be configured to place case units, such as the above described retail merchandise, into picking stock in the one or more levels 130L of the storage structure 130 and then selectively retrieve ordered case units for shipping the ordered case units to, for example, a store or other suitable location. For example, each storage level 130L includes pickface storage/handoff spaces 130S (referred to herein as storage spaces/locations 130S) formed by the rack modules RM. The storage spaces 130S formed by the rack modules RM, in one aspect, include shelves that are disposed along storage or picking aisles 130A (that are connected to the transfer deck 130B) which, e.g., extend linearly through the rack module array RMA and provide bot 110 access to the storage spaces 130S and transfer deck(s) 130B. In other aspects, the storage spaces 130S formed by the rack modules RM may include slots, receptacle, stalls, cribs, cordoned areas, hooks, racks, or other suitable locations with a configuration that allows the bots to pick and place case units to and from the storage spaces. In one aspect, the shelves of the rack modules RM are arranged as multi-level shelves that are distributed along the picking aisles 130A. As may be realized the bots 110 travel on a respective storage level 130L along the picking aisles 130A and the transfer deck 130B for transferring case units between any of the storage spaces 130S of the storage structure 130 (e.g. on the level which the bot 110 is located) and any of the lift modules 150 (e.g. each of the bots 110 has access to each storage space 130S on a respective level and each lift module 150 on a respective storage level 130L). The transfer decks 130B are arranged at different levels (corresponding to each level 130L of the storage and retrieval system) that may be stacked one over the other or horizontally offset, such as having one transfer deck 130B at one end or side RMAE1 of the storage rack array RMA or at several ends or sides RMAE1, RMAE2 of the storage rack array RMA as described in, for example, U.S. patent application Ser. No. 13/326,674 filed on Dec. 15, 2011 the disclosure of which is incorporated herein by reference in its entirety. In other aspects, the storage structure may not have transfer decks on one or more of the level 130L, where the picking aisles may extend so that the bots 110 have access to one or more lifts disposed on a side of the picking aisle in a manner similar to that described in, for example, U.S. Pat. No. 8,974,168 issued on Mar. 10, 2015, the disclosure of which is incorporated herein by reference in its entirety.

The system 100 may also include one or more breakpack stations or modules 130BPK configured to remove individual items (e.g., breakpack goods or vendor packs) from supply containers CUS (e.g., stored in the rack modules RM and transported to the breakpack stations 130BPK by the bots 110) and group them together in a breakpack container CUB, where a customer order includes at least one or more breakpack containers CUB. Suitable examples of breakpack stations are described in U.S. patent application Ser. No. 17/358,383, filed on Feb. 14, 2022 and U.S. patent application Ser. No. 17/657,705 filed on Apr. 1, 2022 both titled "Warehouse System for Storing and Retrieving Goods in Containers," the disclosures of which are incorporated herein by reference in their entireties.

The in-feed transfer stations 160IN and out-feed transfer stations 160UT may operate together with their respective lift module(s) 150A, 150B for bi-directionally transferring case units CU to and from one or more levels 130L of the storage structure 130. It is noted that while the lift modules 150A, 150B may be described as being dedicated inbound lift modules 150A and outbound lift modules 150B, in alternate aspects each of the lift modules 150A, 150B may be used for both inbound and outbound transfer of case units/case units from the storage and retrieval system 100.

As may be realized, the storage and retrieval system 100 may include multiple in-feed and out-feed lift modules 150A, 150B that are accessible by, for example, bots 110 of the storage and retrieval system 100 so that one or more case unit(s), uncontained (e.g. case unit(s) are not held in trays), or contained (within a tray or tote) can be transferred from a lift module 150A, 150B to each storage space on a respective level 130L and from each storage space to any one of the lift modules 150A, 150B on a respective level 130L. The bots 110 may be configured to transfer the case units CU between the storage spaces and the lift modules 150A, 150B. Generally, the lift modules 150A, 150B include at least one movable payload support that may move the case unit(s) between the in-feed and out-feed transfer stations 160IN, 16OUT and the respective level of the storage space where the case unit(s) is stored and retrieved. The lift module(s) may have any suitable configuration, such as for example a reciprocating lift, or any other suitable configuration. The lift module(s) 150A, 150B include any suitable controller (such as controller 120 or other suitable controller coupled to controller 120, warehouse management system 2500, and/or palletizer controller 164) and may form a sequencer or sorter in a manner similar to that described in U.S. patent application Ser. No. 16/444,592 filed on Jun. 18, 2019 (the disclosure of which is incorporated herein by reference in its entirety) that sequences the mixed cases CU according to the predetermined mixed case sequence solution, the predetermined mixed case sequence solution being generated as described herein for the palletizer 160PB to build the pallet load PAL.

The automated storage and retrieval system may include a control system, comprising for example one or more control servers 120 that are communicably connected to the in-feed and out-feed conveyors and transfer stations 160IN, 160UT, the lift modules 150A, 150B, and the bots 110 via a suitable communication and control network 180. The communication and control network 180 may have any suitable architecture, which for example, may incorporate various programmable logic controllers (PLC) such as for commanding the operations of the in-feed and out-feed conveyors and transfer stations 160IN, 160UT, the lift modules 150A, 150B, and other suitable system automation. The control server 120 may include high-level programming that effects a case management system (CMS) 120 managing the case flow system. The network 180 may further include suitable communication for effecting a bi-directional interface with the bots 110. For example, the bots 110 may include an on-board processor/controller 1220. The network 180 may include a suitable bi-directional communication suite enabling the bot controller 1220 to request or receive commands from the control server 180 for effecting desired transport (e.g. placing into storage locations or retrieving from storage locations) of case units and to send desired bot 110 information and data including bot 110 ephemeris, status and other desired data, to the control server 120. As seen in FIG. 2, the control server 120 may be further connected to a warehouse management system 2500 for providing, for example, inventory management, and customer order fulfillment information to the CMS 120 level program. A suitable example of an automated storage and retrieval system arranged for holding and storing case units is described in U.S. Pat. No. 9,096,375, issued on Aug. 4, 2015 the disclosure of which is incorporated by reference herein in its entirety.

Referring still to FIGS. 1 and 2, in the aspects of the present disclosure the out-feed section of system 100, and more specifically out-feed transfer station 160UT and conveyors extending therefrom serve to transport case units retrieved from storage to palletizer 160PB. The palletizer 160PB includes one or more articulated arm 161, 162, each having a respective end of arm tool or end effector 161E, 162E configured to transport case units CU for placement on a mixed case pallet load PAL. A suitable example of a palletizer 160PB is described in U.S. patent application Ser. No. 16/035,204 filed on Jul. 13, 2018 and titled "Apparatus and Method for Building a Pallet Load", the disclosure of which is incorporated herein by reference in its entirety. The interface (not shown) between the out-feed section conveyors and palletizer 160PB may have any desired configuration that facilitates substantially unimposed (with respect to output of the system out-feed section) arrival of ordered case units and placement for unconstrained picking of the case units by the palletizer for building the mixed case pallet load PAL. A palletizer controller 164 is provided to control operation of the palletizer 160PB. In the aspects of the present disclosure shown, the palletizer controller 164 may be a separate control server or processor (e.g. a PC) that may be communicably linked over a suitable network (e.g. network 180 or a different network) for bi-directional communication with the control server 120, and more specifically the CMS level programming of the control server 120. FIG. 2 further illustrates the case wherein a palletizer control 164' may be integrated into the system control server 120. Accordingly, as may be realized, the control level programming (effecting commands for palletizer operation) as well as higher level palletizer programming, such as with a pallet load generator 166, 166' that may be resident on a common processing platform as the control servers 120 or a remote platform palletizer controller 164 as desired. As may be further realized, the palletizer controller 164, 164' may interface with the CMS program of the control server 120 for information on respective orders and case units used for example by the pallet generator in generating the pallet loads corresponding to the respective order. For example, information sought and provided by the CMS program to the palletizer control 164, 164' may include identification information for the respective orders to be filled, the sequence the orders are to be completed, the identification information (e.g. SKUs) of corresponding cases (e.g. which ones and how many) for the respective order, queuing information of cases initialized for retrieval and transport to the palletizer and changes thereto to the extent applicable dimensional data of the respective case and any other desired information.

Referring again to FIGS. 1A, 2, and 2A, fill orders (e.g., customer orders) are received by the warehouse management system 2500. The pallet load generator 166, 166' generates the pallet arrangement plan 184 (e.g., pallet load structure) based on mixed case characteristics, conditions, and constraints of the pallet and/or customer (e.g., pallet size, sequence location of cases by fulfillment conditions, stratification of cases, etc.) provided by the warehouse management system 2500, such as in the manner described in U.S. Pat. No. 8,965,559 (previously incorporated herein by reference in its entirety) where the pallet arrangement plan 184 is stored in a memory accessible by the pallet load generator 166, 166' so that the controller/pallet load generator is programmed with an initial pallet load plan (i.e., the pallet arrangement plan 184 is an initial pallet load plan). The initial pallet arrangement plan 184 may be any suitable plan that forms, completely and stably, the pallet load PAL of mixed packages in mixed package layers L121-L125 in an initial planned pallet load distribution (as described herein, that defines and completes the pallet load initially) such as that described in U.S. Pat. No. 8,965,559 (previously incorporated herein by reference in its entirety); however, any suitable pallet arrangement plan 184 may be employed as the initial pallet arrangement plan. It is noted that the initial pallet arrangement plan 184 describes (prior to any determination a missing case exists) a valid location and pose for each mixed case CU in the pallet load PAL and each case CU has a valid location and pose on the mixed case layer L121-L125, L12T of the pallet arrangement plan 184. As described herein, it is the initial pallet arrangement plan 184 that is modified in real time to account for missing case(s), as described herein, in accordance with the aspects of the present disclosure.

The initial pallet arrangement plan 184, as noted herein, is for highly heterogeneous mixed cases CU and is not the same as the sequence of cases CU at the pallet building robot 14 resolved from the pallet arrangement plan 184. In one aspect, the sequencing of cases CU with the multilevel transport system 190 may be effected in any suitable manner such as in a manner(s) similar to that described in U.S. Pat. No. 10,377,585 issued on Aug. 13, 2019 and titled "Storage and Retrieval System Transport Vehicle", U.S. Pat. No. 9,884,719 issued on Feb. 6, 2018 and titled "Storage and Retrieval System", U.S. patent application Ser. No. 14/997,892 filed on Jan. 18, 2016 and titled "Storage and Retrieval System", U.S. Pat. No. 10,214,355 issued on Feb. 26, 2019 and titled "Storage and Retrieval System", U.S. Pat. No. 10,102,496 issued Oct. 16, 2018 and titled "Storage and Retrieval System", and/or U.S. patent application Ser. No. 16/444,592 filed on Jun. 18, 2109 and titled "Vertical Sequencer for Product Order Fulfillment," and U.S. Pat. No. 11,305,430 issued on Apr. 19, 2022, the disclosures of which are incorporated herein by reference in their entireties.

Still referring to FIGS. 1-3A, as described above, the aspects of the present disclosure provide for real time modifications of the initial pallet load plan 184 when one or more case units, intended to the palletized according to the initial pallet load plan 184, are not delivered to the palletizer 160PB by the automated package transport system 190. In the event of a missing case unit, the controller 120 (and the pallet load generator 164, 164' thereof) is configured to quickly (e.g., in real time during a pallet build, prior to sequencing of the affected case units) modify the initial pallet load plan 184 so as to preserve the general shape of the initial pallet load PAL, and the sequence of case units that are to be delivered to the palletizer 160PB by the automated package transport system 190. As described herein, depending on the structure of the initial pallet load PAL and/or the sizes and positions of the missing case units, there may be several possible ways to modify the initial pallet load plan 184 in the event of a missing case unit. These modifications to the initial pallet load plan 184 are implemented in a pallet load re-plan 185, where the pallet load re-plan 185 provides for building a stable pallet without the undelivered missing case units.

The controller 120, and the pallet load generator 164, 164' thereof, is configured to resolve any void(s) in the initial pallet load plan 184 as a result of a missing case unit(s) by sequentially (or in any other suitable manner) employing the different possible modifications to the initial pallet load plan 184. Here, the different modifications are employed in order of those modifications having a least effect on the initial pallet load plan to those modifications having a greater effect on the initial pallet load plan, where the modification producing a stable pallet load and having the least effect on the initial pallet load is selected by the controller as the pallet load re-plan 185. In other aspects, the different modifications may be performed by the pallet load generator controller 120 in parallel, where the results of parallel determinations are compared and the modification producing a stable pallet load and having the least effect on the initial pallet load is selected by the controller as the pallet load re-plan 185.

The controller 120 is communicably connected so as to register from at least one of the storage array and automated package transport system 190 at least one missing/scratch package/case unit that is undeliverable to the palletizer 160PB. For example, the controller 120 is communicably connected with automated package transport system 190 (e.g., the bots 110 and/or lifts 150 include suitable sensors to identify transported case units and/or locations in which the case units are stored, picked, or otherwise supposed to be located, such scanners effecting identification of a presence or absence of the case units in a designated location) and other automation (e.g., input case scanners/sorters having sensors that effect registration of input case units into storage, etc.) of the material handling system 100 by the network 180. As case units CU are entered into the storage array by the automated package transport system 190, the controller 120 is configured to track/register in memory the storage location 130S and status of the incoming case units CU (e.g., item inventory status and locations). Where a case unit CU is damaged or undeliverable to a designated storage location (as determined by one or more of the infeed transfer stations 160IN, lift 150A, and bots 110) the controller 120 receives a message from the one or more of the infeed transfer stations 160IN, lift 150A, and bots 110 that the case unit is undeliverable and unavailable for palletizing. Similarly, where a case unit CU, intended to be picked by a bot 110 from a designated storage location 130S for palletization, is determined by the bot 110 as not being disposed at the designated storage location 130S (e.g., missing) or becomes jammed or otherwise immovable from the designated storage location, the controller 120 receives a message from the bot 110 that the case unit CU in (or supposed to be in) the designated storage area is undeliverable and unavailable for palletizing. The controller 120 is also configured to receive messages from bots 110 (e.g., that become disabled during case unit transport) carrying case units CU for palletization that the case unit CU onboard the bot is undeliverable and unavailable for palletizing. The above are just a few examples of possible case unit transport disruptions that may result in a scratched/missing case unit and it should be understood that the controller 120 may receive messages from any suitable automation of the material handling system 100 as to the unavailability of that automation or the unavailability of case units to be picked and/or transported by the automation. Here, the controller 120 registers in memory the (at least one) missing case unit (e.g., identified by the automated package transport system 190.

Figure 7:
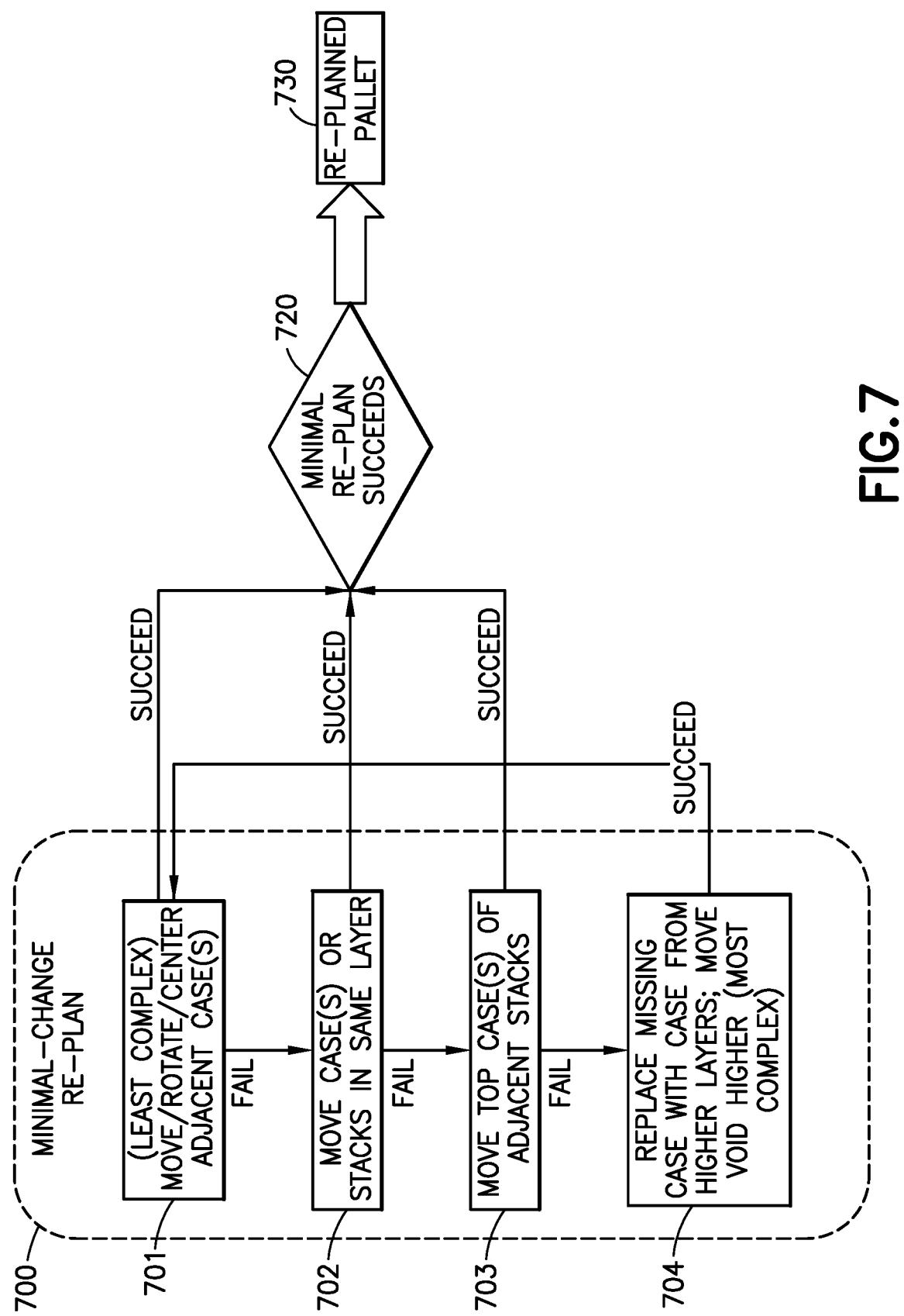
FIG. 7 is an exemplary flow diagram of a pallet load re-plan process effected with the material handling system of FIG. 1 in accordance with aspects of the present disclosure.
Figure 8A:
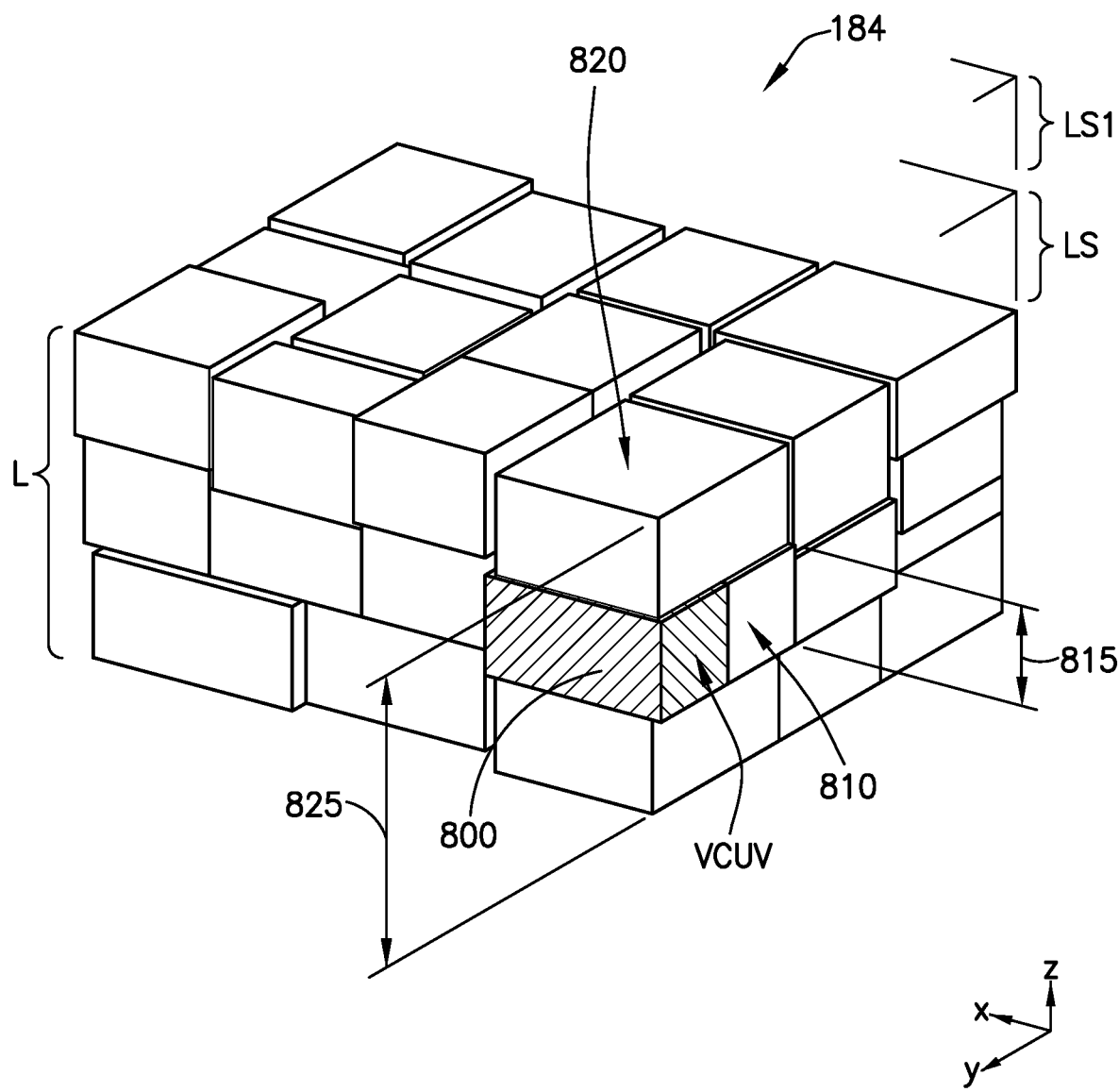
FIGS. 8A and 8B respectively illustrate an initial pallet load plan and a corresponding pallet load re-plan effected, in accordance with aspects of the present disclosure, by the material handling system of FIG. 1 with the pallet load re-plan process of FIG. 7.

Referring also to FIG. 8A (which illustrates an initial planned pallet load distribution), with the missing case units CU registered by the controller, the pallet load generator 164, 164' is arranged or otherwise configured (e.g., with any suitable non-transitory computer program code) to identify a corresponding pallet layer L, of the missing case unit 800, in the initial pallet load plan 184, and determine a corresponding void VCUV, formed by the missing case unit 800 in the corresponding layer L. The pallet load generator 164, 164' is configured (e.g., with any suitable non-transitory computer program code) to determine a measure of stability resultant from the corresponding void VCUV in the corresponding pallet layer L and heuristically resolve the corresponding void VCUV based on optimization of the measure of stability to equal or exceed a predetermined threshold (e.g., a predetermined stability threshold) that characterizes the corresponding pallet layer L with the resolved void VCUV as stable. The pallet load generator 164, 164' is programmed with a meta-pose package resolver 164R (see FIG. 1), for at least one adjacent case unit or package CU adjacent the corresponding void VCUV, that heuristically optimizes the measure of stability of the corresponding pallet layer L from meta poses of the at least one adjacent package (as described herein with respect to, e.g., FIGS. 6A-14) so that the measure of stability equals or exceeds the predetermined threshold and the corresponding void VCUV is resolved. As described herein, the pallet load generator 164, 164' is configured so as to optimize the measure of stability of the corresponding pallet layer L from both heuristic optimization via the meta-pose package resolver 164R, and swapping, at least another package of the initial pallet load plan 184 into the corresponding void VCUV for the missing case unit (i.e., scratch package) 800. As also described herein, the pallet load generator 164, 164' is configured to generate a pallet load re-plan 185 for the automated palletizer 160PB as defined by resolution of each corresponding void VCUV for each missing case unit 800 in the initial pallet load plan 184.

The predetermined stability threshold of the measure of stability characterizes the corresponding pallet layer (which for example in FIG. 8A is layer L, but see also FIGS. 8B-13B) with the resolved void RVCUV as stable for automatic palletization. The predetermined threshold of the measure of stability also characterizes resolution of the corresponding void VCUV to the resolved void RVCUV, and reformation of the corresponding pallet layer L, destabilized by the corresponding void VCUV, to a stable layer (see FIGS. 8B, 9B, 10B, 10C, 11B, 12B, and 13B) made stable by the resolved void RVCUV. The stable layer defines a stable support SUP, commensurate with each other stable layer of the pallet load re-plan 185, for automatic palletization of all superposed layers (see e.g., layers LS, LS1 in FIG. 8B, layers L9S in FIG. 9B, layer L10S in FIGS. 10B and 10C, layer L11S in FIG. 11B, layer L12S in FIG. 12B, and layer L13S in FIG. 13B) on the stable layer. As an example, the predetermined stability threshold is the point at which the case units/stacks in a layer and/or in a pallet load PAL become unstable so as to topple or fall as a result of the expected forces experienced during pallet build and transport, as described herein.

As also described herein, optimization of the measure of stability may be effected from at least one of reposing (e.g., moving and/or rearranging) a case unit, swapping/substituting at least one case unit for the missing case unit, and swapping pallet layers. In other aspects, the optimization of the measure of stability may be effected in any suitable manner. As described herein, reposing a case unit includes repositioning, relative to the corresponding void VCUV, at least one adjacent case unit (e.g., adjacent to the void VCUV) horizontally in the initial pallet load plan 184 and/or changing, relative to the corresponding void VCUV, an orientation of the at least one adjacent case unit in the initial pallet load plan 184. As also described herein, swapping a case unit includes swapping/substituting at least another case unit of the initial pallet load 184 into the corresponding void VCUV in place of the missing/scratched case unit. The pallet load generator 164, 164' is configured to generate the pallet load re-plan 185 for the automated palletizer 160PB as defined by resolution of each corresponding void VCUV for each scratch case unit in the initial pallet load plan 184.

Figure 4:
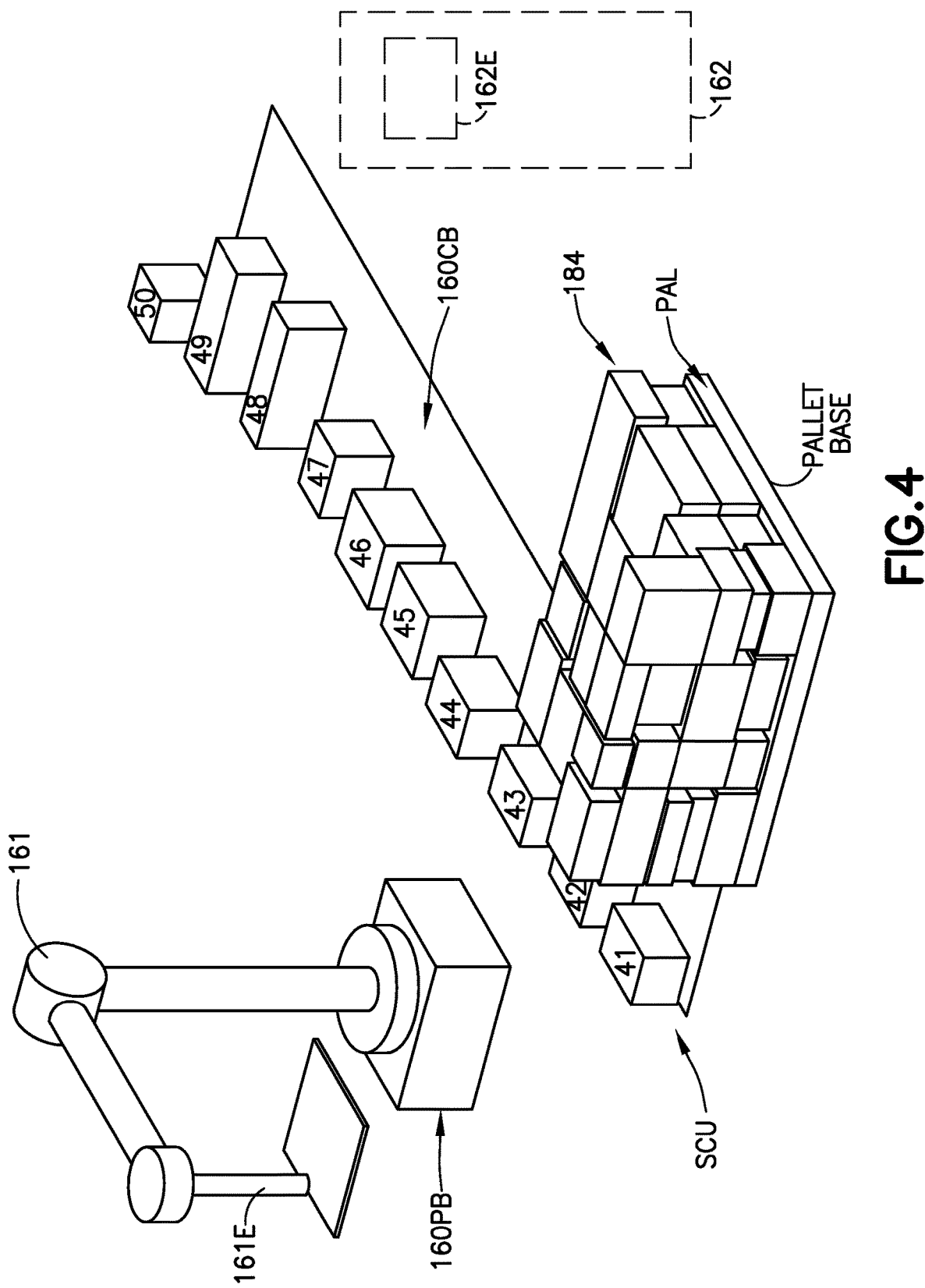
FIG. 4 is a schematic illustration of a portion of the material handling system of FIG. 1 in accordance with aspects of the present disclosure.
Figure 5:
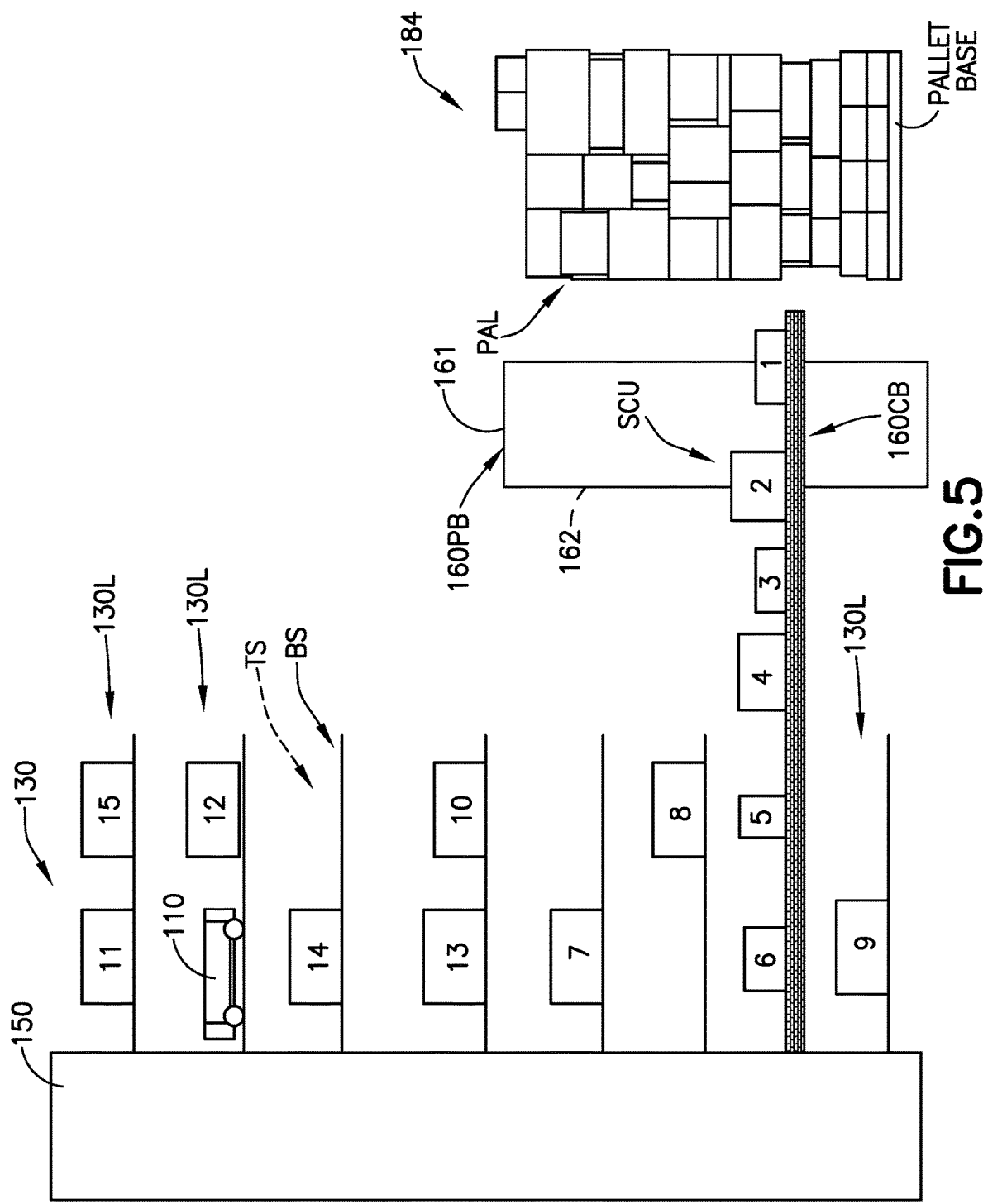
FIG. 5 is a schematic illustration of a portion of the material handling system of FIG. 1 in accordance with aspects of the present disclosure.

Referring to FIGS. 1, 2, 4, and 5, it is again noted that a pallet load re-plan 185 may be effected for any portion of an initial pallet load 184 that has not yet been sequenced for palletizing. FIGS. 4 and 5 illustrate case units CU at various staged of delivery to the palletizer 160PB. For example, FIG. 4 illustrates a pallet load PAL build according to an initial pallet load plan 184, where the pallet load PAL includes mixed case units having different dimensions. Here the case units are illustrated as being placed on the outbound conveyor 160CB in a pre-determined palletizing placement sequence. In the example illustrated in FIG. 4, case units in sequence for palletizing SCU having placement sequence numbers 1-40 have been placed in the pallet load PAL (and their positions and orientations are not changed in a pallet load re-plan 185) while case units having sequence numbers 41-50 are arranged on the outbound conveyor 160CB for sequential placement in the pallet load PAL. The case units placed on the outbound conveyor 160CB are considered to be "in sequence for palletizing" and the placement sequence of these cases may not be changed in a pallet load re-plan 185 although the positions of the sequenced case units in the pallet load PAL relative to the original or initial pallet load plan 184 may be changed; noting that anomalies in placement of case units in sequence for palletizing may be addressed/resolved in a manner substantially similar to that described in U.S. Pat. No. 11,305,430 issued on Apr. 19, 2022, the disclosure of which was incorporated herein by reference in its entirety In FIG. 5, the pallet load PAL build is illustrated with case units already in the pallet load PAL where the next case units (e.g., case units with sequence numbers 1-6) are disposed on the outbound conveyor 160CB in sequence for palletizing. As described above, the case units already placed in the pallet load PAL are not affected by any pallet load re-plan 185, while only the position (not the placement sequence) of the case units in sequence for palletizing SCU may be changed in a pallet load re-plan 185. The case units CU are delivered to the outbound conveyor 160CB from one or more storage levels 130L by the multilevel transport system 190. The position and/or placement sequence of the case units that are in transit (or still in a storage space but allocated for the pallet load PAL, i.e., those case units not in "sequence for palletizing") to the outbound conveyor 160CB may be changed in a pallet load re-plan 185. These in transit case units are identified with sequence numbers 7-15 (although the sequence numbers may change in a pallet load re-plan 185). It is noted that some of the in transit case units may be placed, by the bots 110, in buffered positions such as on buffer shelves BS or at transfer stations TS, according to sequencing in an original pallet load plan 184 in a manner to maximize case unit delivery rate (e.g., to optimize throughput). Here, the controller 120, and the pallet load generator 164, 164' thereof, is configured to preserve the optimized delivery rate in any pallet load re-plan 185 that may be effected to resolve a missing case unit.

Figure 6A:
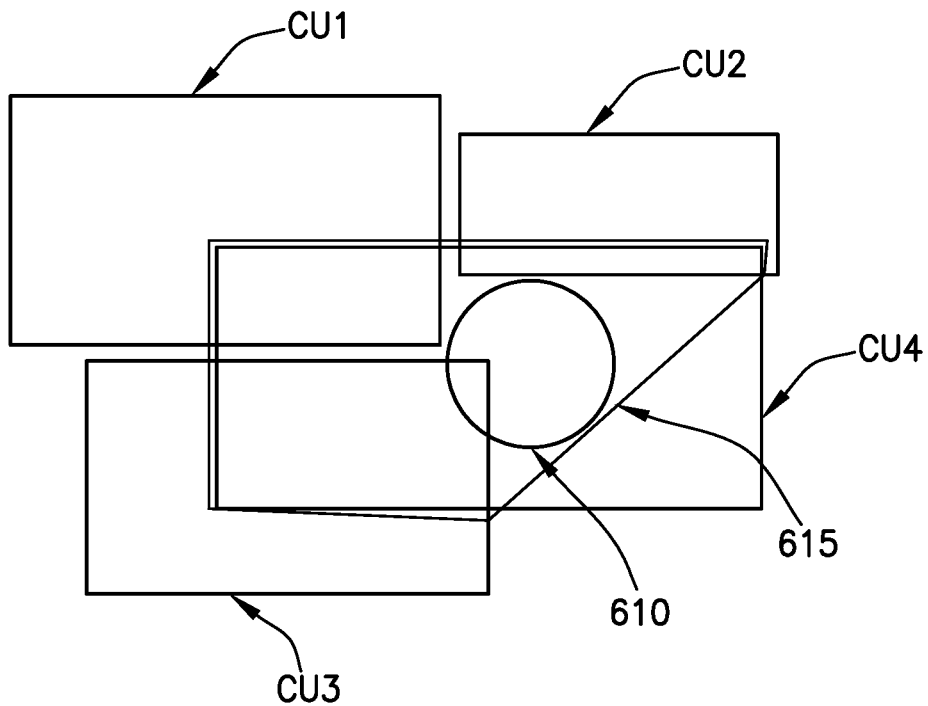
FIGS. 6A and 6B are schematic illustrations of a measure of stability of cases stacked with the material handling system of FIG. 1 in accordance with aspects of the present disclosure.
Figure 6B:
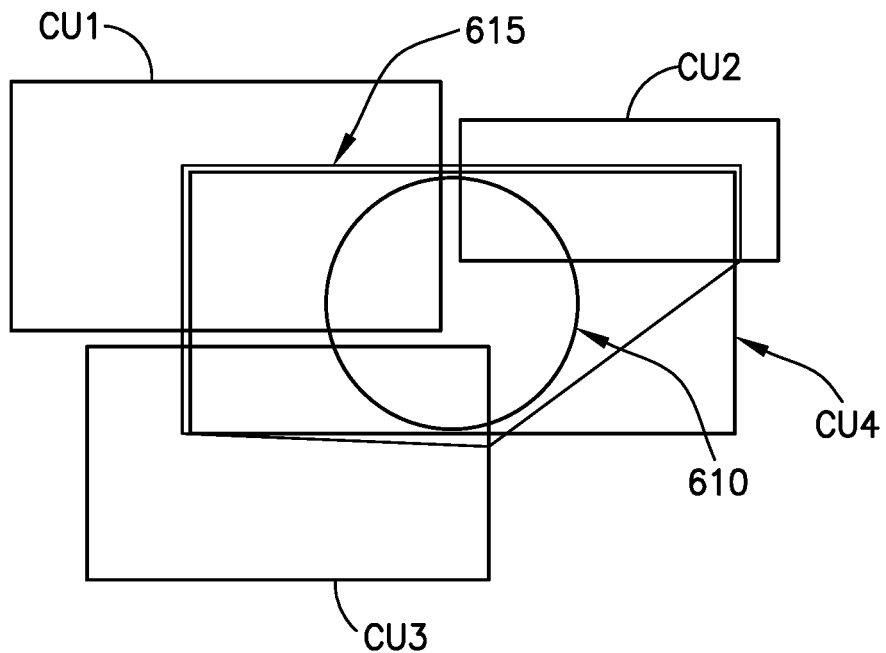

Referring to FIGS. 4A, 6A, and 6B and as noted herein, in the pallet load re-plan 185 a measure of stability is optimized in view of the void VCUV formed by the missing case unit. The measure of stability (or degree of stability) for any given case unit in a pallet load may be defined, at least in part, as being proportional to a containment radius 610 disposed around a centroid of a case unit CU4, within which containment radius 610 all points belong to a bounding polygon (e.g., convex hull 615) of supports of the case unit CU4 formed by inferior case units CU1-CU3 on which the case unit CU4 is seated. The containment radius 610 is the minimal distance from a center of gravity projection of the case unit to an edge of the convex hull 615. FIGS. 6A and 6B illustrate (in a top view illustration of case units) a static stability of a case unit CU4 supported by/seated on other case units CU1-CU3. The arrangement of the case units in FIGS. 6A and 6B is exemplary only and in other aspects, the case units may have any suitable arrangement. Here, case unit CU4 is placed on top of case units CU1-CU3 so that the bottom face of case unit CU4 is substantially level (e.g., in a horizontal plane). For the static stability, the center of gravity of the case unit CU4, projected to the bottom face of the case unit CU4, is to be located inside of the convex hull 615 of all of the case unit's CU4 supporting surfaces (e.g., the supporting surfaces being the overlaps of the case unit's CU4 bottom face with the top faces of the supporting case units CU1-CU3). The convex hull 615 is a convex polygon enveloping all points of the supporting surfaces. It is noted that because the shape of each case unit may not be perfectly rectangular, and placement of each case unit may not precisely coincide with a pallet load plan, the center of gravity projection of the case unit CU4 is to be substantially inside the convex hull 615. Here, the larger the containment radius 610, the more stable is the case unit CU4 placement. As can be seen in FIGS. 6A and 6B, case unit CU4 in FIG. 6B is shifted in the horizontal plane so that the case unit CU4 has a larger supporting surface area, compared to FIG. 6A, so that the convex hull 615 and hence the containment radius 610 is larger resulting in a more stable case placement. The pallet load generator 164, 164' is configured so as to maximize the containment radius of any case units CU whose positions/orientations are modified in a pallet load re-plan so that the resulting pallet load is stable during pallet build and transport. As may be realized, the measure of stability may also include metrics (e.g., determined empirically in any suitable manner) corresponding to a resistance of the case units/stacks to toppling or falling over from the expected forces experienced during pallet build and transport as described herein.

Exemplary pallet re-plans and stability determinations are illustrated and described herein with respect to FIGS. 8A-13B where the pose of one or more case units in a pallet layer are changed and/or one or more case units in the pallet layer (or a subsequent layer) or swapped with a missing case unit. It is noted that the reposing and swapping of the case units may be employed by the pallet load generator 164, 164' in any suitable combination, not limited to those illustrated herein.

Referring to FIGS. 1, 2, and 7, to effect production of the pallet load re-plan 185, the pallet load generator 164, 164' (of controller 120) is configured with minimal change re-plan algorithms 700, at least some of which may be included in the meta-pose package resolver 164R, that increase in complexity (which algorithms may be referred to as re-plan or change variances) and include, but are not limited to a move/rotate/center adjacent case units algorithm 701, a move case(s) or stacks in the same layer algorithm 702, a move top case(s) of adjacent stacks algorithm 703, and a replace missing case(s) with case(s) from higher layers/ move void higher algorithm 704. The minimal change re-plan algorithms 700 are executed by the pallet load generator 164, 164', in order of complexity so that the containment radius 610 for the case units in the pallet load plan are maximized with the least complex of the minimal change re-plan algorithms 700 that produces a stable and buildable pallet load re-plan (e.g., maximize the containment radius with minimalist movements of case units in the pallet load plan). With one or more case units missing from the initial pallet load plan 184, the pallet load generator 164, 164' is configured to execute the minimal change re-plan algorithms 700 in sequence (e.g., from less complex to more complex) until one of the minimal change re-plan algorithms 700 is successful in producing a stable and buildable re-planned pallet load 185. With the determination of a minimal change re-plan algorithm 700 that is successful in producing the stable and buildable re-planned pallet load 185, the pallet load generator 164, 165, selects the re-plan pallet load 185 of the successful minimal change algorithm 700 and cancels execution of remaining minimal change re-plan algorithms 700.

Figure 8B:
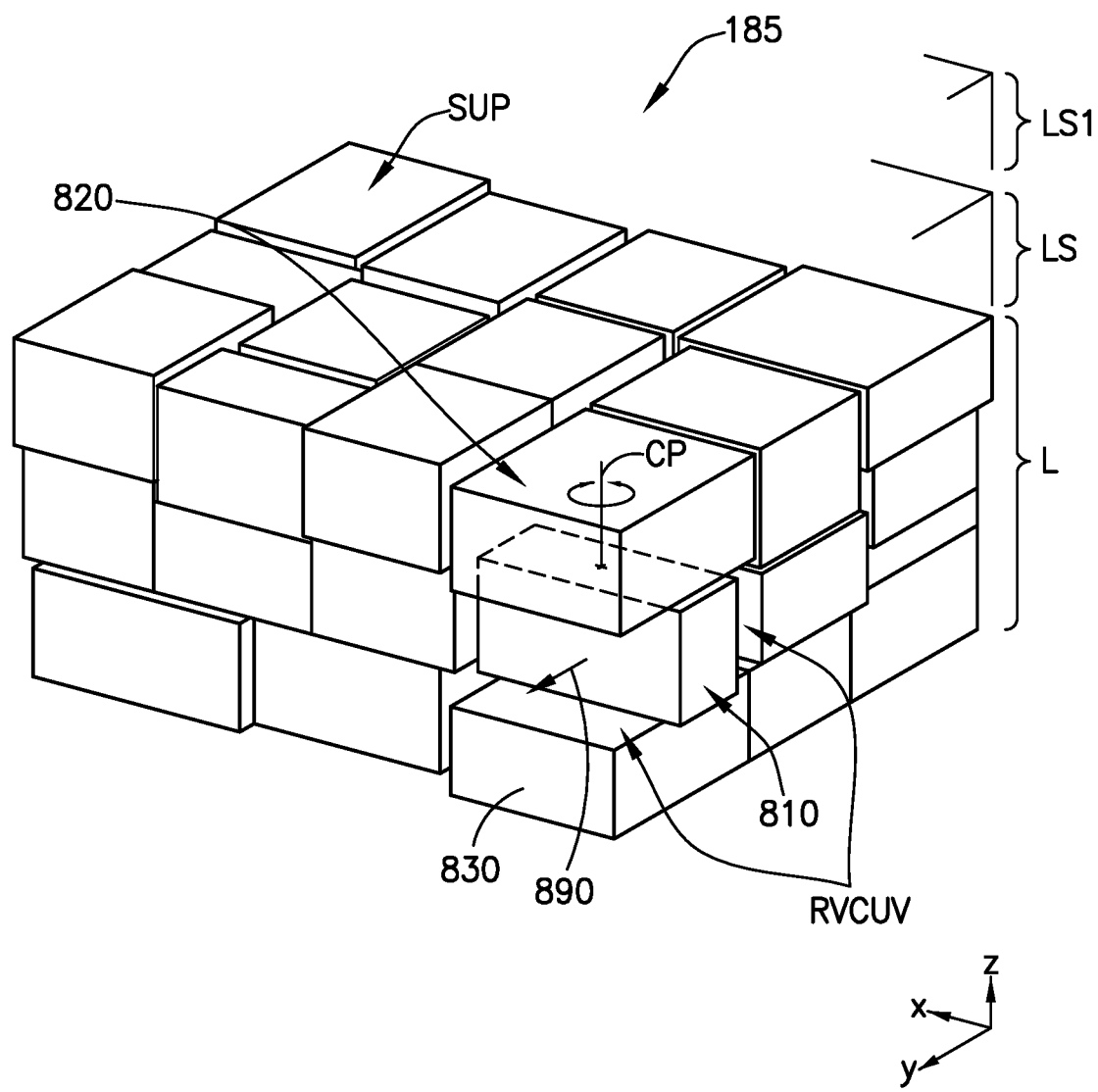

As an example, the pallet load generator 164, 164' is configured to begin the re-plan pallet load determination process by executing the least complex algorithm, e.g., the move/rotate/center adjacent case units algorithm 701 (examples of which are provided below with respect to FIGS. 8A-10C, where the (possible) poses resulting from the moving, rotation, and/or centering of a case unit may be collectively referred to as meta poses from which the pallet load generator 164, 165', via the meta-pose package resolver 164R, heuristically optimizes a measure of stability of the corresponding pallet layer). For example, referring also to FIGS. 8A and 8B, an exemplary pallet load re-plan 185 for layer L will be described. Here, the initial pallet load plan 184 is modified where a corresponding void VCUV of missing case unit 800 is disposed adjacent a case unit 810. The case units 810, 800 have a similar height 815 and are both part of a stack 820 of case units in a layer L having other stacks of substantially similar stack heights 825. In this example, stability of the layer L and the of the stack 820 is effected in the pallet load re-plan 185 by shifting/repositioning (e.g., changing a pose of) the case unit 810 in the horizontal (e.g., X-Y) plane in direction 890 towards the void VCUV so that the case unit 810, at least in part, closes (e.g., encroaches within) the corresponding void VCUV (e.g., the repose of the at least one adjacent case unit 810 includes a horizontal translation of the at least one adjacent case unit 810 at least partially into the corresponding void VCUV). As can be seen in FIG. 8B, the case unit 810 is shifted in direction 890 to substantially the center of the stack 820 so as to produce a stable re-planned pallet load. The pallet load generator 164, 164' is configured to generate the pallet load re-plan 185 for the palletizer 160PB as defined by resolution of (each) corresponding void (e.g., the resolved void RVCUV) for each missing/scratch case unit in the initial pallet load plan 184.

While the case unit 810 is described above as being horizontally translated to the center of the stack 820, in the pallet load generator 164, 164' is configured to horizontally translate the case unit 810 (e.g., at least one adjacent package) in a sequence of incremental pose translations, where such translation may be between an initial position of the case units 810 (as shown in FIG. 8A) to any position within the corresponding void VCUV. The pallet load generator 164, 164' determines a measure of stability for each of the incremental pose translations of the case unit 810 and selects a pose of the case unit 810, for the pallet load re-plan 185, corresponding to the incremental pose translation having the greatest measure of stability (which in this example, the selected pose is at the center of the stack 820).

Still referring to FIGS. 8A and 8B, if the case unit 810 and the corresponding void VCUV were disposed at the top of the stack 820, and a superposed layer LS in the initial pallet load plan 184 includes case units interlocked with the case unit 810 and the corresponding void VCUV as well as another superposed layer LS1, the shifting of the case unit 810 as described above to close the void VCUV may result in instability of one or more of the layers LS, LS1. Here, the pallet load re-plan 185 may modify the layer L to swap the case unit 810 with one or more case units (e.g., case unit 830) below the case unit 810 in the stack 820 so that the centered case unit 810 is no longer at the top of the stack 820 in the layer L. Another modification to the layer L may include changing a pose of the case unit 810 (as described herein with respect to FIGS. 9A and 9B), such as by rotating the case unit 810 by 90 degrees (or other suitable rotational angle) around its center point CP in the re-planned position illustrated in FIG. 8B if such rotation would not produce spatial intersections with adjacent stacks of the same layer L, and would result in a more stable position (e.g., with larger values of the containment radii-see FIGS. 6A and 6B) of the case units CU directly above and supported by the case unit 810.

Figure 9A:
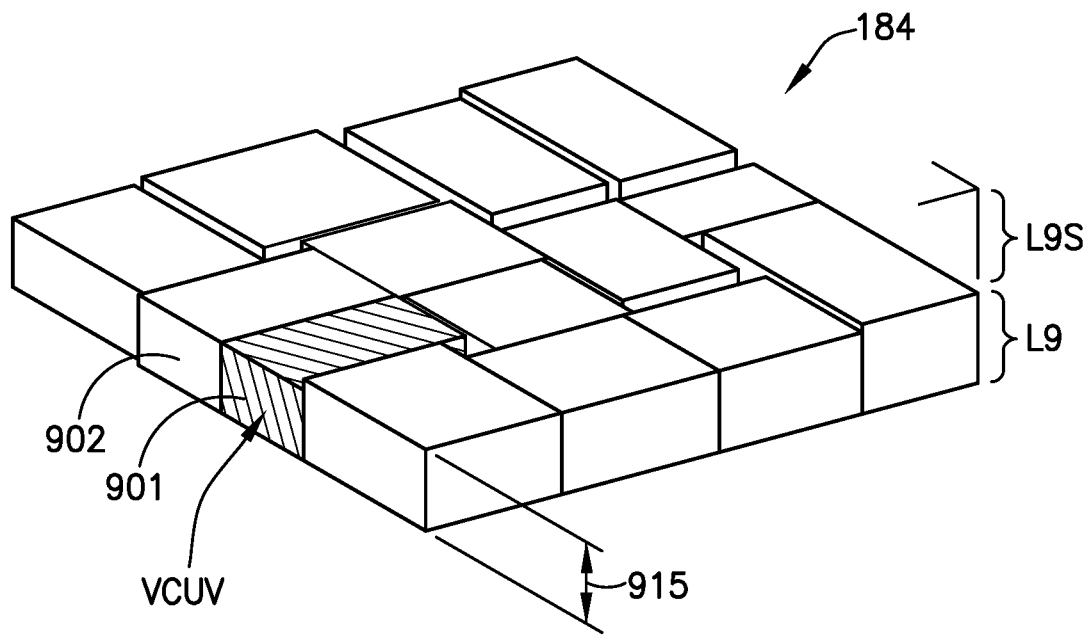
FIGS. 9A and 9B respectively illustrate an initial pallet load plan and a corresponding pallet load re-plan effected, in accordance with aspects of the present disclosure, by the material handling system of FIG. 1 with the pallet load re-plan process of FIG. 7.
Figure 9B:
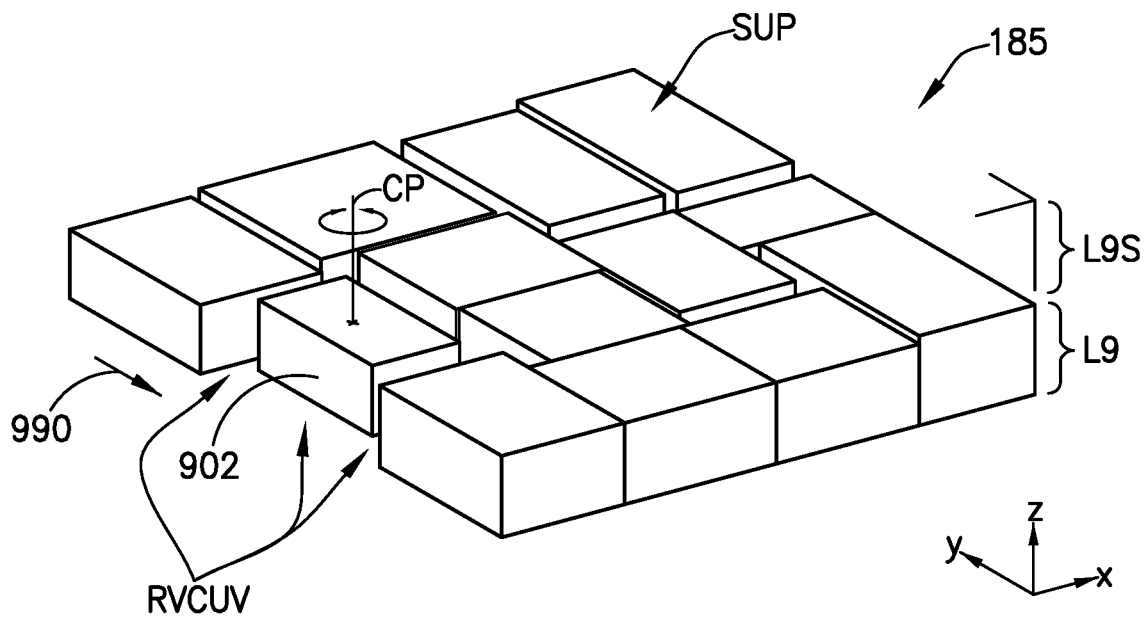

Referring to FIGS. 9A and 9B, an example of changing a pose of a case unit so as to produce a stable re-planned pallet load will be described. FIGS. 9A and 9B illustrate a layer L9 or a portion of the layer L9 where the case units have substantially the same height 915, where an initial pallet load distribution plan for layer L9 is illustrated in FIG. 9A and the pallet load re-plan is illustrated in FIG. 9B. While the case units in the layer L9 are illustrated as having the same height, it is noted that the pose change of one or more cases described with respect to FIGS. 9A and 9B may be equally applied to layers of stacked case units (such as illustrated in FIGS. 8A, 8B, and 11A-13B) where each case unit may be different, but the stacks have substantially the same height, provided that the missing case unit itself has a height of an entire stack in the layer or all case units in the stack are missing/scratched.

In this example, the case unit 901 is missing and leaves a void VCUV in the pallet layer L9. To resolve the void VCUV into the resolved void RVCUV the pallet load generator 164, 164' shifts (e.g., horizontally translates) adjacent case unit 902 (e.g., adjacent to the void VCUV) in direction 990 to substantially center the adjacent case unit 902 within the void VCUV (closing the void VCUV at least in part to the resolved void RVCUV) while rotating the adjacent case unit 902 about its center point CP so that the adjacent case has a rotated and shifted position in the pallet load re-plan 195 (e.g., repose of the at least one adjacent case unit 902 includes a rotation of the at least one adjacent case unit 902 about a center CP of the at least one adjacent case unit 902 from an initial rotational pose (shown in FIG. 9A) to a translated rotation pose (shown in FIG. 9B). While the adjacent case unit 902 is illustrated in FIG. 9B as being rotated about its center point CP, the pallet load generator 164, 164' is configured to determine the measure of stability of the pallet load re-plan 185 with the case unit 902 in both an un-rotated orientation (as in FIG. 9A) and the rotated orientation (as in FIG. 9B) (e.g., the pallet load generator 164, 164' determines a measure of stability for the at least one package in both the initial rotational pose and the translated rotational pose) such that the pose of the case unit chosen/selected for the pallet load re-plan 185 by the pallet load generator 164, 164' is the pose that produces the greatest stability (e.g., with larger values of containment radii) of the case units placed above the case unit 902 in a superposed layer L9S and does not create spatial overlaps with adjacent case units in the same layer L9. Again, as noted above, the pallet load generator 164, 164' is configured to generate the pallet load re-plan 185 for the palletizer 160PB as defined by resolution of (each) corresponding void (e.g., the resolved void RVCUV) for each missing/scratch case unit in the initial pallet load plan 184.

Figure 10A:
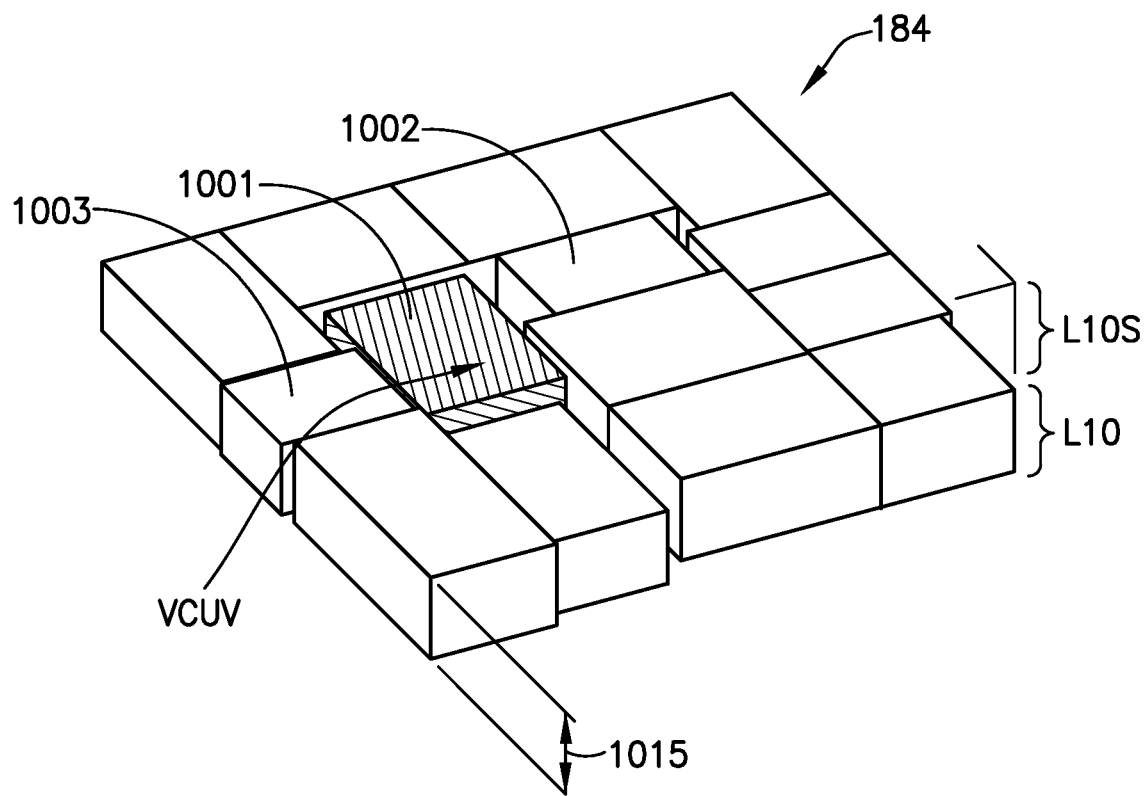
FIG. 10A illustrates an initial pallet load plan and FIGS. 10B, and 10C illustrate corresponding pallet load re-plans effected, in accordance with aspects of the present disclosure, by the material handling system of FIG. 1 with the pallet load re-plan process of FIG. 7.
Figure 10B:
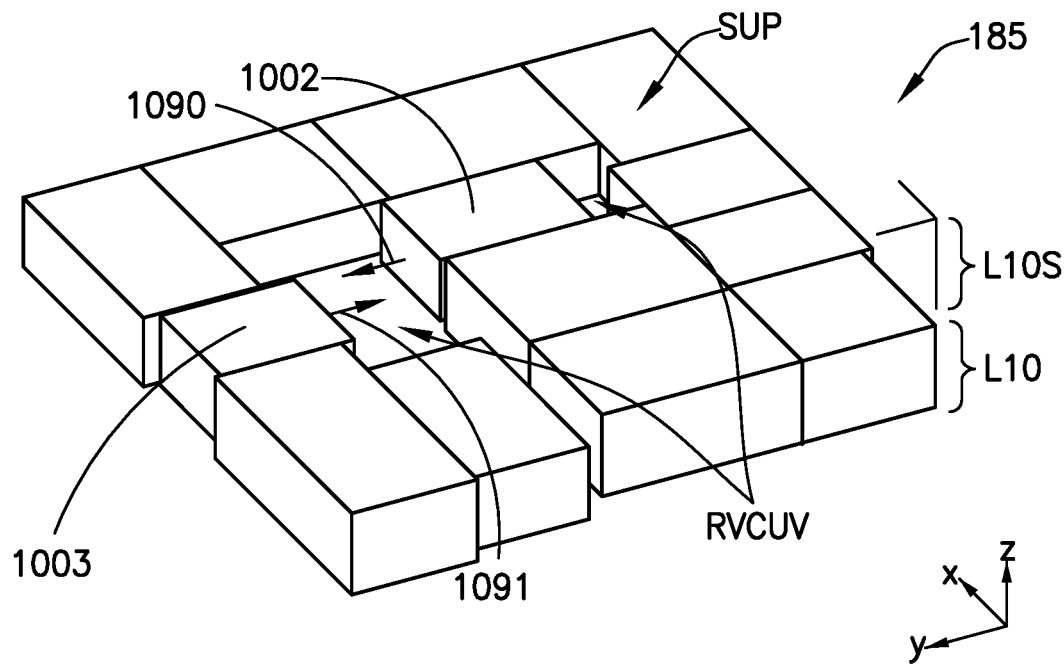
Figure 10C:
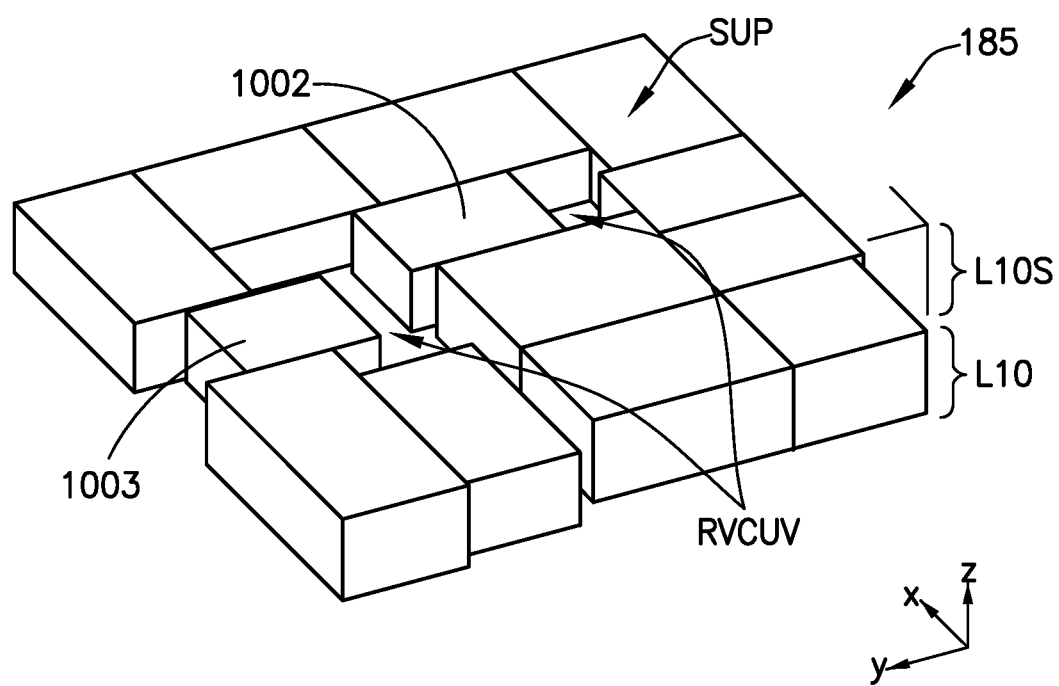

FIGS. 10A, 10B, and 10C illustrate another example of pallet load re-plan 185 for layer L10 where an initial pallet load distribution plan for layer L10 is illustrated in FIG. 10A and pallet load re-plans are illustrated in FIGS. 10B and 10C; however, in this example the pallet load generator 164, 164' generates the pallet load re-plan 185 by repositioning more than one adjacent case unit to resolve the void VCUV left by missing case unit 1001. FIGS. 10A, 10B, and 10C illustrate a layer L10 or a portion of the layer L10 where the case units have substantially the same height 1015. While the case units in the layer L10 are illustrated as having the same height, it is noted that the pose change of one or more cases described with respect to FIGS. 10A, 10B, and 10C may be equally applied to layers of stacked case units (such as illustrated in FIGS. 8A, 8B, and 11A-13B) where each case unit may be different, but the stacks have substantially the same height, provided that the missing case unit itself has a height of an entire stack in the layer or all case units in the stack are missing/scratched.

In this example, the case unit 1001 is missing and leaves a void VCUV in the pallet layer L10. To resolve the void VCUV into the resolved void RVCUV the pallet load generator 164, 164' shifts (e.g., changes the pose of) more than one adjacent case unit 1002, 1003 (e.g., adjacent to the void VCUV). In this example, case unit 1002 is shifted in direction 1090 and case unit 1003 is shifted in direction 1091 so that both of the case units 1002, 1003 encroach the void VCUV to, at least in part, close the void VCUV to the resolved void RVCUV in the pallet load re-plan 185. In this example, the pallet load generator 164, 164' is configured to iteratively determine the measure of stability of the pallet load re-plan 185 with increasingly larger positional shifts (e.g., compare FIGS. 10B and 10C) of one or more the adjacent case units 1002, 1003 into the void VCUV until the adjacent case units 1002, 1003 have spatial overlaps with each other or other case units in the layer L10. For each positional shift of the one or more of the case units 1002, 1003 the pallet load generator 164, 164' determines the measure of stability and selects the positional shifts for the respective case units 1002, 1003 that produce the greatest stability (e.g., with larger values of containment radii) of the case units placed above the case units 1002, 1003 in a superposed layer L10S and does not create spatial overlaps with adjacent case units in the same layer L10. Again, as noted above, the pallet load generator 164, 164' is configured to generate the pallet load re-plan 185 for the palletizer 160PB as defined by resolution of (each) corresponding void (e.g., the resolved void RVCUV) for each missing/scratch case unit in the initial pallet load plan 184.

Figure 11A:
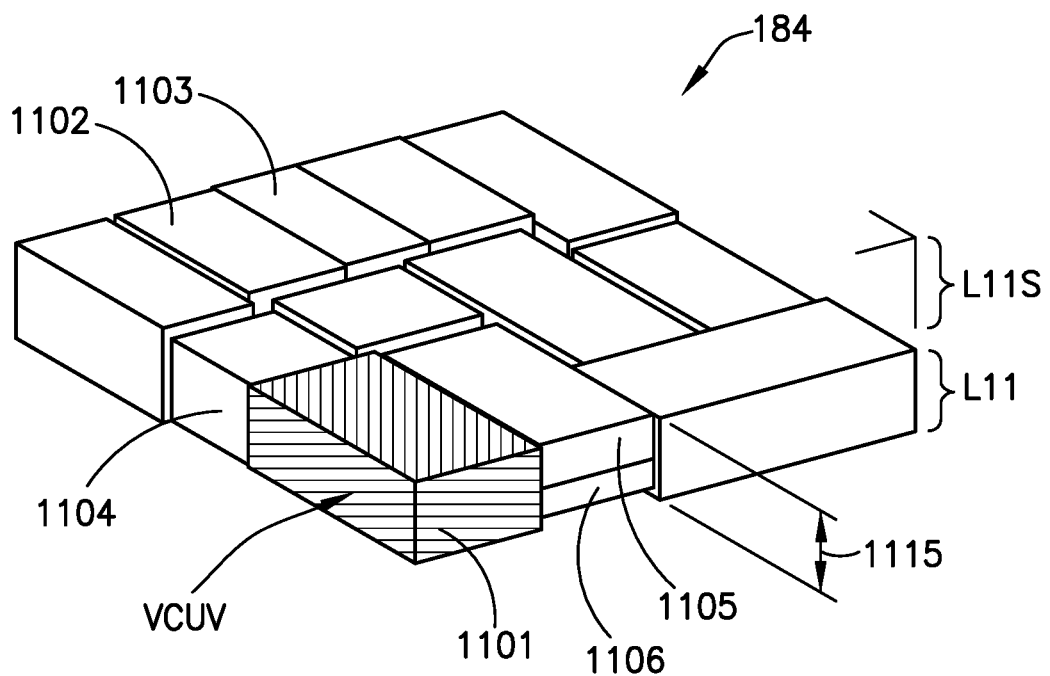
FIGS. 11A and 11B respectively illustrate an initial pallet load plan and a corresponding pallet load re-plan effected, in accordance with aspects of the present disclosure, by the material handling system of FIG. 1 with the pallet load re-plan process of FIG. 7.
Figure 11B:
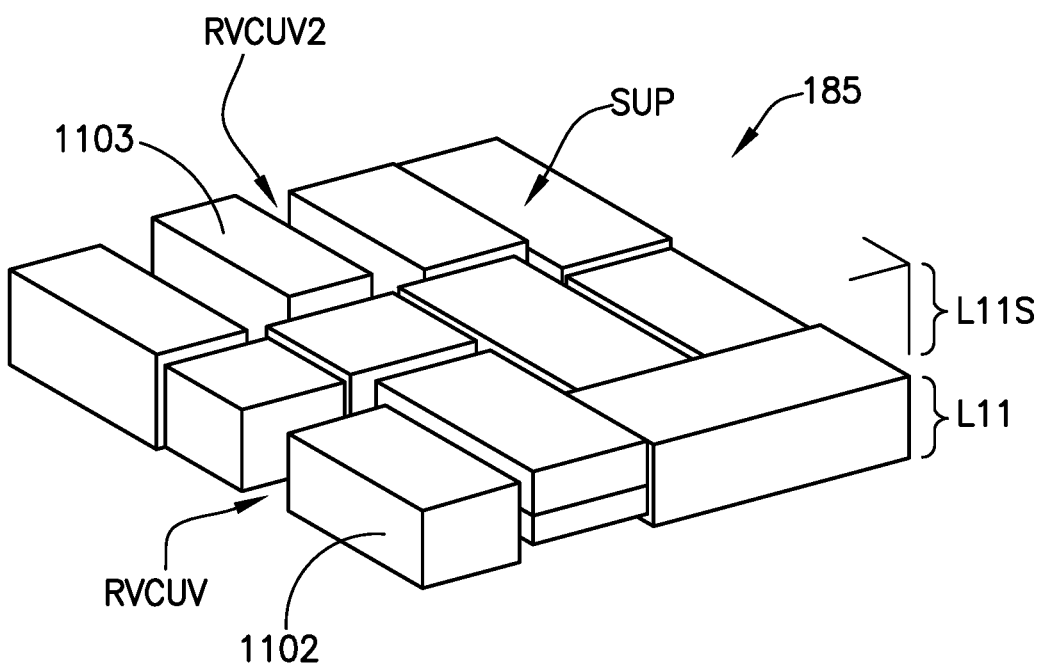

In a manner similar to that described above, the pallet load generator 164, 164' is configured to horizontally translate more than one of the at least one adjacent case unit (e.g., case units 1002, 1003) in respective sequences of incremental pose translations (e.g., case unit 1002 is moved in a respective sequence of incremental pose translations in direction 1090 and/or case unit 1003 is moved in a respective sequence of incremental pose translations in direction 1091). The pallet load generator 164, 164' determines a measure of stability for each combination of the respective incremental pose translations of the case units 1002, 1003 and selects respective poses of the case units 1002, 1003, for the pallet load re-plan 185, corresponding to a combination of the respective incremental pose translations having the greatest measure of stability.

Where the move/rotate/center adjacent cases algorithms 701 described above are successful in producing a stable and buildable pallet load re-plan 185 (FIG. 7, Block 720), the remaining, more complex, algorithms 702-704 are cancelled and the pallet load is re-planned (FIG. 7, Block 730).

Where the move/rotate/center adjacent cases algorithms 701 described above are unsuccessful, the pallet load generator 164, 164' is configured to determine whether the moving cases/stacks within the same layer algorithm 702 produces a stable and buildable re-planned pallet load 185. For example, also referring to FIGS. 11A and 11B, another example of a pallet load re-plan 185 is illustrated with respect to pallet layer L11, where an initial pallet load distribution plan for layer L11 is illustrated in FIG. 11A and the pallet load re-plan is illustrated in FIG. 11B. Here the pallet layer L11 has height 1115 and includes stacks of case units, where each stack substantially has the height 1115 and one more case units therein. In this example, the missing case unit 1101 is large compared to other case units in the layer L11 and reposing adjacent case units 1104, 1105, 1106 may not result in a stable configuration of case units in a superposed layer L11S. Here, the pallet load generator 164, 164' is configured to effect swapping at least another case unit by placing the at least another case unit within the corresponding void VCUV, where the at least another case unit and the missing/scratch case unit belong to a same/common pallet load layer, such as pallet load layer L11. For example, the pallet load generator 164, 164' is configured to determine whether there exists one or more case units in the same layer L11, that are smaller in length and width and have a height (or a combined height) substantially equal to the missing case unit 1101. Where such one or more case units exist (in this example case unit 1102 is smaller than case unit 1101 in length and width and has the height 1115), the pallet load generator 164, 164' produces a pallet load re-plan 185 that repositions/swaps case unit 1102 in the center of the void VCUV left by missing case unit 1101 so as to resolve the void VCUV to resolved void RVCUV if such a move results in a stable configuration (e.g., with larger values of containment radii) of case units above the resolved void RVCUV in a superposed layer L11S.

Figure 12A:
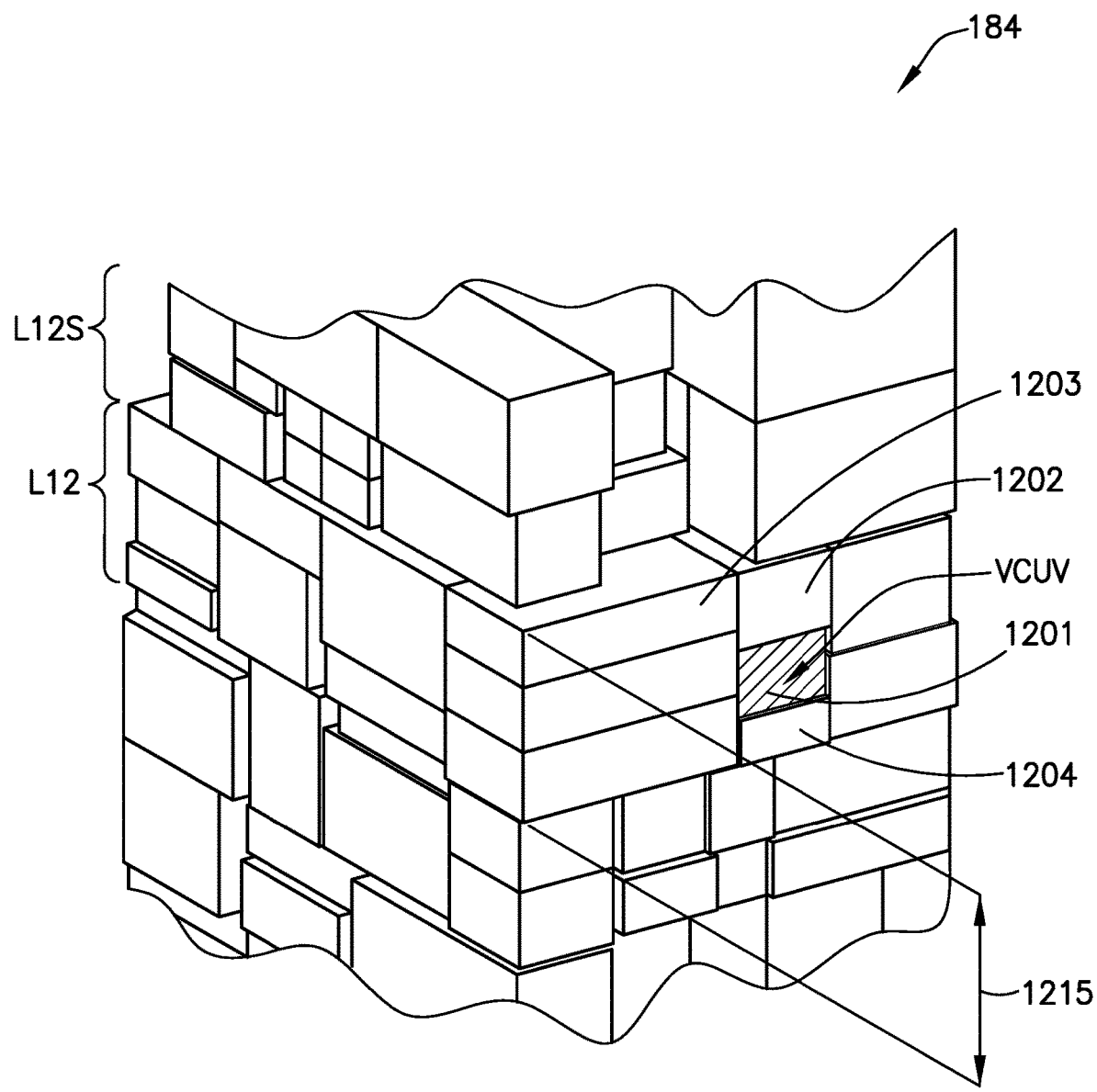
FIGS. 12A and 12B respectively illustrate an initial pallet load plan and a corresponding pallet load re-plan effected, in accordance with aspects of the present disclosure, by the material handling system of FIG. 1 with the pallet load re-plan process of FIG. 7.
Figure 12B:
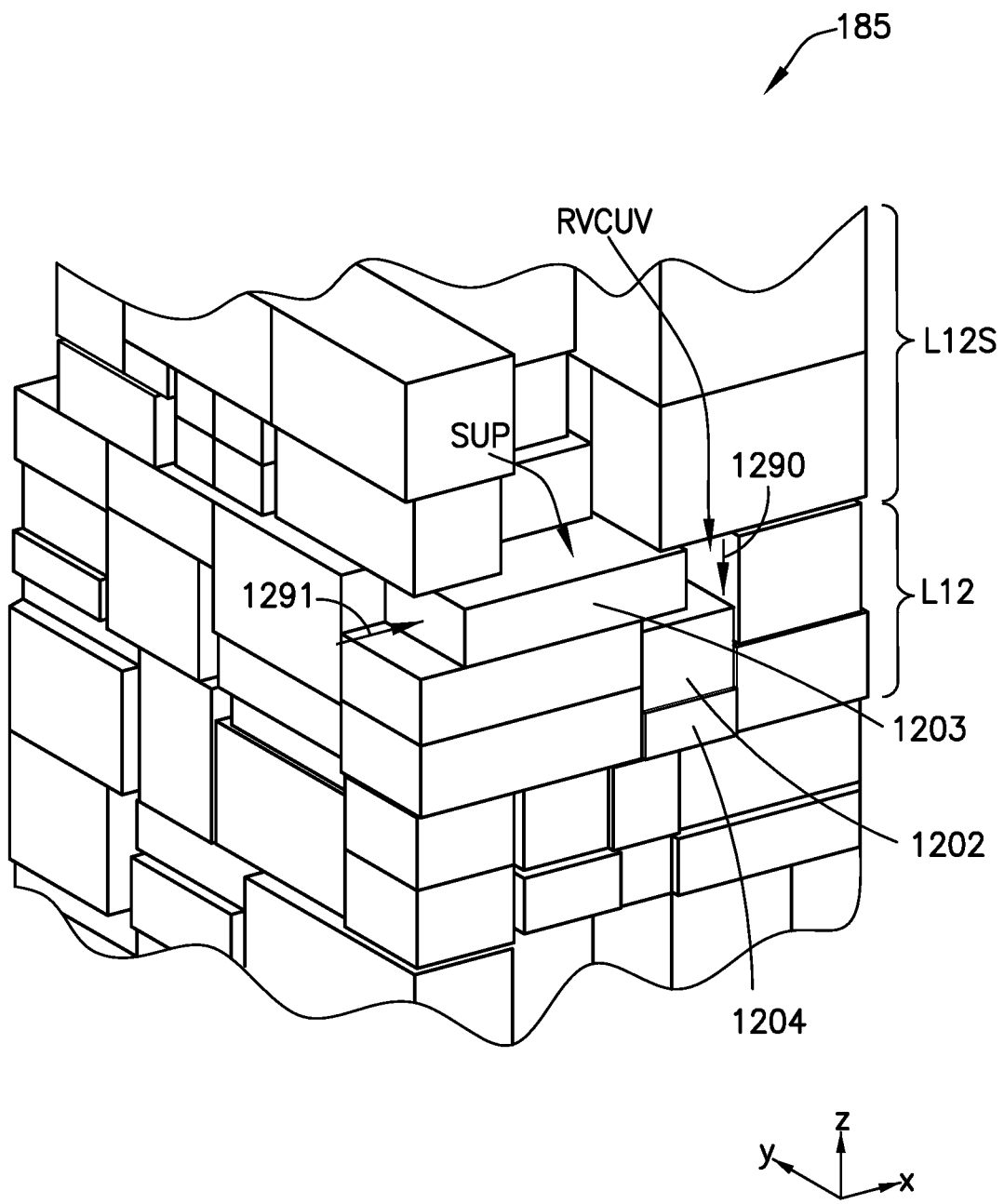
Figure 13A:
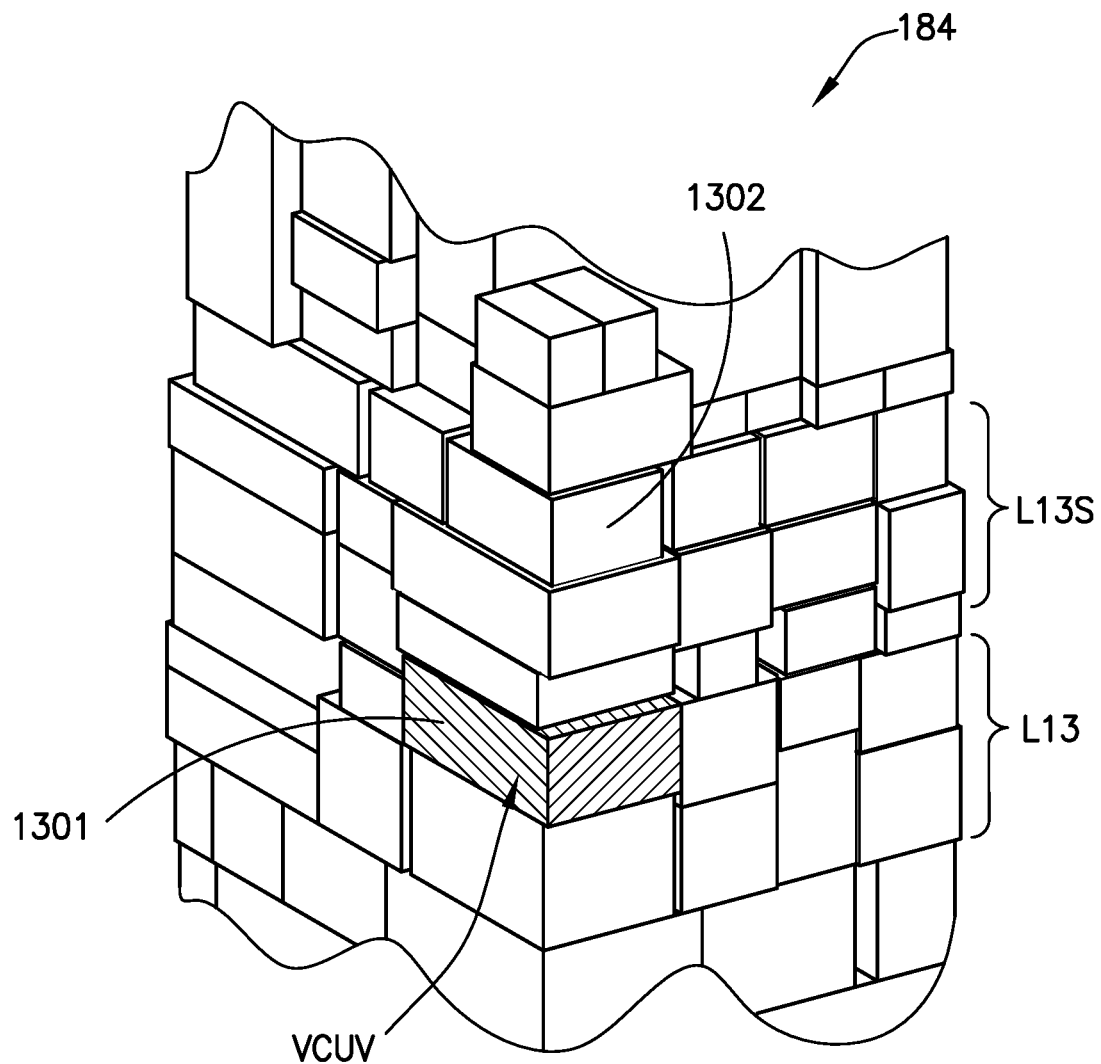
FIGS. 13A and 13B respectively illustrate an initial pallet load plan and a corresponding pallet load re-plan effected, in accordance with aspects of the present disclosure, by the material handling system of FIG. 1 with the pallet load re-plan process of FIG. 7.
Figure 13B:
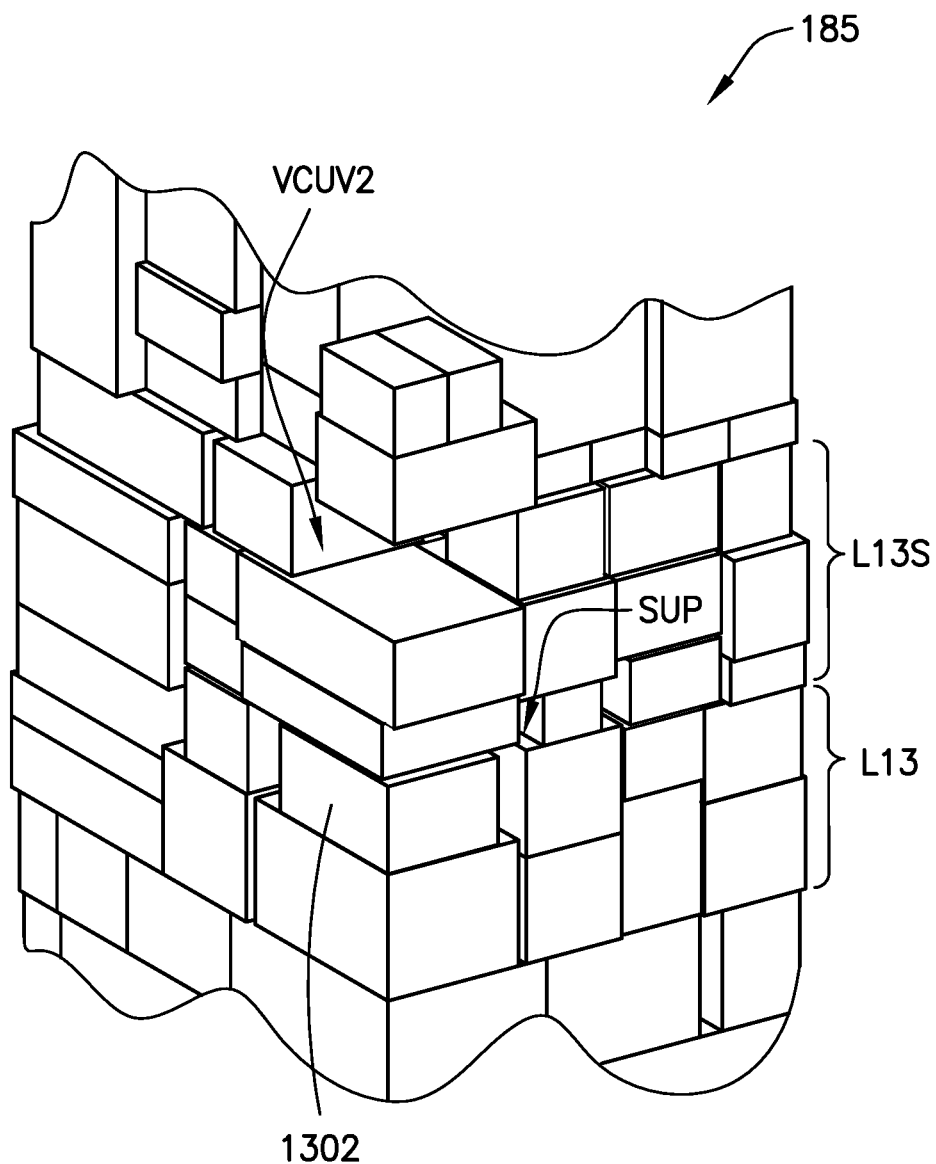

As may be realized, substituting or swapping case unit 1102 for missing case unit 1101 leaves another void in the initial pallet load plan 184 in the pallet layer position designated for case unit 1102. This other void is resolved in one of the manners described herein, such as by shifting or changing the pose of an adjacent case unit 1103 so as to position the adjacent case unit in the center of the other void so as to resolve the other void to another resolved void RVCUV2. In other aspects, the other void may also be resolved by moving/swapping another case unit in the same/common layer, having a smaller length and width than the case unit 1102, into the pallet layer position designated for case unit 1102 to fill the void left by case unit 1102, if such a move would result in a stable configuration of case units (e.g., with larger values of containment radii) above the resolved void RVCUV2 in the superposed layer L11S. The pallet load generator 164, 164' in resolving the pallet load re-plan 195 may also determine stability of the case units in the pallet load re-plan 185 where one or more of the cases 1102, 1103, 1104, 1105, 1106 are rotated, and implement such rotation in the pallet load re-plan if such rotation provides a stable configuration of case units (e.g., with larger values of containment radii) above the resolved void RVCUV2 in the superposed layer L11S. As noted above, the pallet load generator 164, 164' is configured to generate the pallet load re-plan 185 for the palletizer 160PB as defined by resolution of each corresponding void (e.g., the resolved voids RVCUV and RVCUC2) for each missing/scratch case unit and/or each repositioned case unit in the initial pallet load plan 184.

Where the move case(s)/stack(s) in the same layer algorithm 702 described above is successful in producing a stable and buildable pallet load re-plan 185 (FIG. 7, Block 720), the remaining, more complex, algorithms 703-704 are cancelled and the pallet load is re-planned (FIG. 7, Block 730).

Where the move case(s)/stack(s) in the same layer algorithm 702 described above is unsuccessful, the pallet load generator 164, 164' is configured to determine whether the move top case(s) of adjacent stacks algorithm 703 produces a stable and buildable re-planned pallet load 185. For example, referring also to FIGS. 12A and 12B, a pallet load re-plan 185 is illustrated with respect to pallet layer L12, where an initial pallet load distribution plan for layer L12 (and the pallet load in general) is illustrated in FIG. 12A and the pallet load re-plan is illustrated in FIG. 12B. Here the pallet layer L12 includes stacks of case units, where each of the stacks has a height substantially equal to a height 1215 of the pallet layer L12. In this example, the missing case unit 1201 is part of a stack in the layer L12, but the stack has other case units 1202, 1204 that are present in the pallet load re-plan 185 (e.g., case unit 1204 is disposed below the void VCUV left by the missing case unit 1201 and case unit 1202 is disposed above the void VCUV left by the missing case unit 1201). To resolve the void VCUV the pallet load generator 164, 164' is configured to effect swapping at least another case unit by lowering the at least another case unit within the common stack of case unit into the corresponding void VCUV. For example, to resolve the void VCUV to the resolved void RVCUV the pallet load generator 164, 164' is configured to (where the movements of the case units do not produce spatial overlaps of the cases in the layer L12) move the case unit 1202 disposed above the void VCUV (e.g., at the top of the respective stack) down (i.e., in direction 1290) into the void VCUV, so as to close the void VCUV and seat against the adjacent case unit 1204. Here, swapping the case unit 1202 (e.g., the at least another case unit) closes the corresponding void VCUV at least in part and creates another void corresponding to an initial position of the case unit 1202.

The pallet load generator 164, 164' is configured to at least partially close the other void, created with movement of case unit 1202 in direction 1290, by at least one of a repose, relative to the other void, at least one adjacent case unit 1203 adjacent the other void in the initial pallet load plan 184, and swapping (as described herein), at least another package of the initial pallet load plan 184 into the other void for (e.g., created via movement of) the swapped package 1202. In this example, the pallet load generator 164, 164' moves (e.g., horizontally translates) case unit 1203 (at the top of an adjacent stack in the same layer) in direction 1291 at least partially into the other void, created within the common stack from the movement of case unit 1202, so that case units in layer L12S superposed and seated on case unit 1290 are stable (e.g., with larger values of containment radii as described herein). As described above, the measure of stability of the pallet load re-plan 185 is determined for more than one iteration of case unit 1203 placement, with the case unit being moved in direction 1291 by different amounts (without producing spatial overlaps with adjacent case units) relative to its initial position in the initial pallet load plan 184, where the pallet load generator 164, 164' selects the positional shift for the case units 1203 that produces the greatest stability (e.g., with larger values of containment radii) of the case units placed above the case unit 1203.

Where the move top case(s) of adjacent stack(s) algorithm 703 described above is successful in producing a stable and buildable pallet load re-plan 185 (FIG. 7, Block 720), the remaining, more complex, algorithm 704 is cancelled and the pallet load is re-planned (FIG. 7, Block 730).

Where the move top case(s) of adjacent stack(s) algorithm 703 described above is unsuccessful, the pallet load generator 164, 164' is configured to determine whether the replace missing case(s) with case(s) from higher layers/move void higher algorithm 704 produces a stable and buildable re-planned pallet load 185. For example, referring also to FIGS. 13A (illustrating an initial pallet load plan) and 13B (illustrating a pallet load re-plan) an example of a pallet load re-plan 185 with respect to pallet layer L13 is illustrated, where the layer L13 includes stacks of case units, where each of the stacks has a height substantially equal to a height 1315 of the pallet layer L13. In this example, the pallet load generator 164, 164' is configured to effect swapping at least another case unit by placing the at least another case unit from a superposed pallet load layer, relative to a pallet load layer of the missing/scratch case unit, to within the corresponding void VCUV. For example, the pallet load generator 164, 164' is configured to at least partially close the void VCUV left by the missing case unit 1301 in the initial pallet load plan 184 with a case unit 1302 from another layer L13S in the initial pallet load plan 194, where the case unit layer L13S is superposed on the layer L13 and the case unit 1302 has a higher placement sequence number than (i.e., is sequenced to be placed after) the case unit 1301. Here, the case unit 1302 is selected by the pallet load generator 134, 164' based on similarity of case unit characteristics (e.g., length, width, and/or height) compared to the missing case unit 1301. In this example, the height of the case unit 1302 substantially matches the height of the missing case unit 1301 and the length and width of the case unit 1302 are equal to or less than the length and width of the missing case unit 1301 so that the case unit 1302 fits within the void VCUV substantially without overhang of the case unit 1302 outside the bounds of the pallet base.

As may be realized, movement of the case unit 1302 to fill the void VCUV creates another void VCUV2 (e.g., higher up in case placement sequence of the pallet load) that may be at least partially closed in any suitable manner, such as described herein with respect to FIGS. 7-12B. Here, the pallet load generator 164, 164 recursively executes the minimal change re-plan algorithms 700 to fill voids in the pallet load plan from the lowermost missing case (e.g., the missing case having the lowest sequence number) until the top of the pallet load is reached resolving all missing cases and the pallet load (or at least the portion of the pallet load not sequenced for palletizing as described herein) is re-planned.

Figure 14:
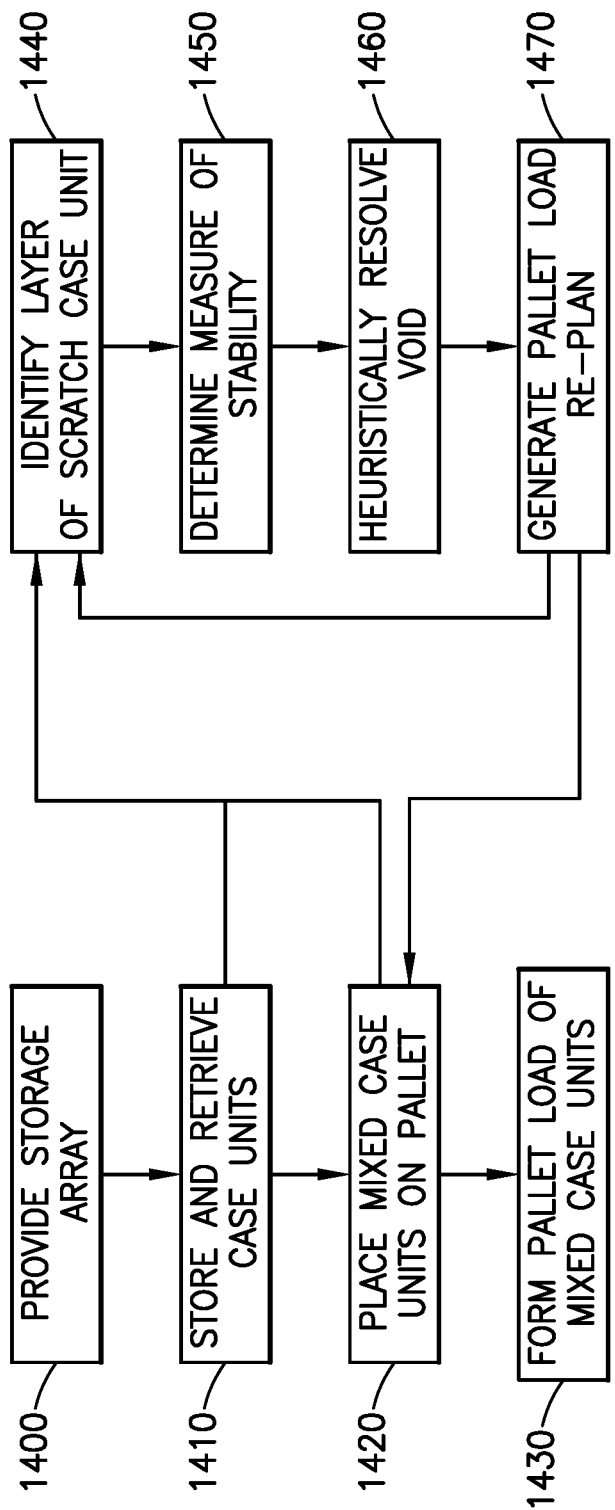
FIG. 14 is an exemplary flow diagram of a method for handling and placing packages onto pallets with the material handling system of FIG. 1 in accordance with aspects of the present disclosure.

Referring to FIGS. 1, 2, 3A, and 6A-13B, an exemplary method for handling and placing packages onto pallets destined for an order store will be described in accordance with the aspects of the present disclosure. In the method, a storage array of a material handling system 100 is provided with storage spaces 130S for holding case units CU therein (FIG. 14, Block 1400). The multilevel transport system 190 stores and retrieves case units (FIG. 14, Block 1410) from the storage spaces 130S of the storage array. The automated palletizer 160PB places mixed case units onto a pallet (FIG. 14, Block 1420) to form a pallet load PAL of mixed packages (see FIG. 3A), where the automated palletizer 160PB is communicably connected to the multilevel transport system 190 which provides individual case units (see FIGS. 2, 4, and 5) from the storage array to the automated palletizer 160PB for forming the pallet load PAL of mixed case units, where the pallet load PAL of mixed packages includes more than one composite layers L121-L125, L12T (see FIG. 3A) of mixed packages. As described herein, the controller 120 is programmed with the pallet load generator 164, 164' having an initial pallet load plan 184, and the controller 120 forms, completely and stably, the pallet load PAL of mixed case units (FIG. 14, Block 1430) in mixed case unit layers in an initial planned pallet load distribution (as described herein).

As described herein, a pallet load re-plan 185 may be effected for any portion of an initial pallet load 184 that has not yet been sequenced for palletizing. The controller 120, as also noted herein, registers, from at least one of the storage array and the multilevel transport system 190, at least one scratch/missing package, and with the pallet load generator 164, 164' identifies a corresponding pallet layer, of the scratch/missing case unit, in the initial pallet load plan 184 (FIG. 14, Block 1440), and determines a corresponding void CVUV, formed by the scratch/missing case unit, in the corresponding pallet layer. The pallet load generator 164, 164' determines a measure of stability (FIG. 14, Block 1450) resultant from the corresponding void CVUV in the corresponding pallet layer and heuristically resolves the corresponding void CVUV (FIG. 14, Block 1460) based on optimization of the measure of stability to equal or exceed a predetermined threshold from at least one of: a repose, relative to the corresponding void CVUV, at least one adjacent case unit adjacent the corresponding void CVUV in the initial pallet load plan 184 (as described herein), and a swapping, at least another case unit of the initial pallet load plan 184 into the corresponding void CVUV for the scratch/missing case unit (as described herein). The pallet load generator 164, 164' generates a pallet load re-plan 185 (as described herein) (FIG. 14, Block 1470) for the automated palletizer 160PB as defined by resolution of each corresponding void CVUV for each scratch/missing case unit in the initial pallet load plan 184. As described herein, the pallet load generator 164, 164' is programmed with a meta-pose package resolver 164R (see FIG. 1), for at least one adjacent case unit or package CU adjacent the corresponding void VCUV, that heuristically optimizes the measure of stability of the corresponding pallet layer L from meta poses of the at least one adjacent package so that the measure of stability equals or exceeds the predetermined threshold and the corresponding void VCUV is resolved. The pallet load generator 164, 164' is configured so as to optimize the measure of stability of the corresponding pallet layer L from both heuristic optimization via the meta-pose package resolver 164R, and swapping, at least another package of the initial pallet load plan 184 into the corresponding void VCUV for the missing case unit (i.e., scratch package) 800. The pallet load generator 164, 164' is also configured to generate the pallet load re-plan 185 for the automated palletizer 160PB as defined by resolution of each corresponding void VCUV for each missing case unit 800 in the initial pallet load plan 184. Referring to FIGS. 2 and 4, while the aspects of the present disclosure are described above with respect to building a pallet load PAL with a single articulated arm 161 of the automated palletizer 160PB, in some aspects the automated palletizer 160PB may have more than one articulated arm 161, 162 working in concert to build a pallet load PAL (see FIG. 2). The more than one articulated arm 161, 162 have overlapping access to the pallet load PAL, which overlapping access spans at least a portion of a footprint of the pallet base. As can be seen in FIG. 2, each of the articulated arms 161, 162 of the automated palletizer 160PB has a respective conveyor 160CB from which respective case units are picked for sequential placement in the pallet load PAL. The pallet load generator 164, 164' is configured to, with the initial pallet load plan 184 assigning the missing/scratch case unit to a first of the articulated arms 161, 162 of the automated palletizer 160PB, heuristically resolve the corresponding void VCUV (in the manners described herein) only from case units assigned in the initial pallet load plan 184 to the first articulated arm 161, 162; and with the initial pallet load plan 184 assigning the missing/scratch case unit to a second of the articulated arms 161, 162 of the automated palletizer 160PB, heuristically resolve the corresponding void VCUV (in the manners described herein) only from case units assigned in the initial pallet load plan 184 to the second articulated arm 161, 162.

In accordance with one or more aspects of the present disclosure, a material handling system for handling and placing packages onto pallets destined for an order store is provided. The material handling system comprises:

a storage array with storage spaces for holding packages therein;

an automated package transport system communicably connected to the storage array for storing packages within the storage spaces of the storage array and retrieving packages from the storage spaces of the storage array;

an automated palletizer for placing mixed packages onto a pallet to form a pallet load of mixed packages, the automated palletizer is communicably connected to the automated package transport system which provides individual packages from the storage array to the automated palletizer for forming the pallet load of mixed packages, the pallet load of mixed packages including more than one composite layers of mixed packages; and a controller operably connected to the automated palletizer, the controller being programmed with a pallet load generator with an initial pallet load plan for forming, completely and stably, the pallet load of mixed packages in mixed package layers in an initial planned pallet load distribution;

wherein:

the controller is communicably connected so as to register from at least one of the storage array and the automated package transport system at least one scratch package, wherein the pallet load generator is arranged to identify a corresponding pallet layer, of the scratch package, in the initial pallet load plan, and determine a corresponding void, formed by the scratch package, in the corresponding pallet layer; and the pallet load generator is configured to determine a measure of stability resultant from the corresponding void in the corresponding pallet layer and heuristically resolve the corresponding void based on optimization of the measure of stability to equal or exceed a predetermined threshold from at least one of:

repose, relative to the corresponding void, at least one adjacent package adjacent the corresponding void in the initial pallet load plan, and swapping, at least another package of the initial pallet load plan into the corresponding void for the scratch package; and the pallet load generator is configured to generate a pallet load re-plan for the automated palletizer as defined by resolution of each corresponding void for each scratch packages in the initial pallet load plan.

In accordance with one or more aspects of the present disclosure the repose of the at least one adjacent package closes the corresponding void at least in part.

In accordance with one or more aspects of the present disclosure, the predetermined threshold of the measure of stability characterizes the corresponding pallet layer with the resolved void as stable for automatic palletization.

In accordance with one or more aspects of the present disclosure, the predetermined threshold of the measure of stability characterizes resolution of the corresponding void to a resolved void, and reformation of the corresponding pallet layer, destabilized by the corresponding void, to a stable layer made stable by the resolved void.

In accordance with one or more aspects of the present disclosure, the stable layer defines a stable support, commensurate with each other stable layer of the pallet load re-plan, for automatic palletization of all superposed layers on the stable layer.

In accordance with one or more aspects of the present disclosure, the measure of stability is proportional to a containment radius disposed around a centroid of a package, within which containment radius all points belong to a bounding polygon of supports of the package formed by inferior packages on which the package is seated.

In accordance with one or more aspects of the present disclosure repose of the at least one adjacent package includes a horizontal translation of the at least one adjacent package at least partially into the corresponding void.

In accordance with one or more aspects of the present disclosure the pallet load generator is configured to: horizontally translate the at least one adjacent package in a sequence of incremental pose translations; determine a measure of stability for each of the incremental pose translations of the at least one adjacent package; and select a pose of the at least one package, for the pallet load re-plan, corresponding to the incremental pose translation having the greatest measure of stability.

In accordance with one or more aspects of the present disclosure the pallet load generator is configured to: horizontally translate more than one of the at least one adjacent package in respective sequences of incremental pose translations; determine a measure of stability for each combination of the respective incremental pose translations of the more than one of the at least one adjacent package; and select respective poses of the more than one of the at least one package, for the pallet load re-plan, corresponding to a combination of the respective incremental pose translations having the greatest measure of stability.

In accordance with one or more aspects of the present disclosure repose of the at least one adjacent package includes a rotation of the at least one adjacent package about a center of the at least one adjacent package from an initial rotational pose to a translated rotation pose.

In accordance with one or more aspects of the present disclosure the pallet load generator is configured to: determine a measure of stability for the at least one package in both the initial rotational pose and the translated rotational pose; and select a pose of the at least one package, for the pallet load re-plan, corresponding to the one initial rotational pose and the translated rotational pose having the greatest measure of stability.

In accordance with one or more aspects of the present disclosure swapping the at least another package closes the corresponding void at least in part and creates another void corresponding to an initial position of the at least another package.

In accordance with one or more aspects of the present disclosure the pallet load generator is configured to resolve the other void based on optimization of the measure of stability to equal or exceed a predetermined threshold from at least one of: repose, relative to the other void, at least one adjacent package adjacent the other void in the initial pallet load plan, and swapping, at least another package of the initial pallet load plan into the other void for the swapped package.

In accordance with one or more aspects of the present disclosure the pallet load generator is configured to effect swapping the at least another package by placing at least another package within the corresponding void, wherein the at least another package and the scratch package belong to a common pallet load layer.

In accordance with one or more aspects of the present disclosure the pallet load generator is configured to effect swapping the at least another package by placing the at least another package from a superposed pallet load layer, relative to a pallet load layer of the scratch package, to within the corresponding void.

In accordance with one or more aspects of the present disclosure the scratch package and the at least another package are disposed in a common stack of packages, and the pallet load generator is configured to effect swapping the at least another package by lowering the at least another package within the common stack of packages into the corresponding void.

In accordance with one or more aspects of the present disclosure the pallet load generator is further configured to horizontally translate the at least one adjacent package, in an adjacent stack of packages, at least partially into another void created within the common stack of packages by the lowering of the at least another package.

In accordance with one or more aspects of the present disclosure, the material handling system further comprises another automated palletizer for placing mixed packages onto the pallet to form the pallet load of mixed packages, the another automated palletizer and the automated palletizer having overlapping access that spans at least a portion of a footprint of the pallet, where the pallet load generator is configured to: with the initial pallet load plan assigning the scratch package to the automated palletizer, heuristically resolve the corresponding void only from packages assigned in the initial pallet load plan to the automated palletizer; and with the initial pallet load plan assigning the scratch package to the another automated palletizer, heuristically resolve the corresponding void only from packages assigned in the initial pallet load plan to the another automated palletizer.

In accordance with one or more aspects of the present disclosure, a method for handling and placing packages onto pallets destined for an order store is provided. The method includes:
  providing a storage array, of a material handling system, with storage spaces for holding packages therein;
  storing packages within the storage spaces of the storage array and retrieving packages from the storage spaces of the storage array with an automated package transport system, of the material handling system, that is communicably connected to the storage array;
  placing, with an automated palletizer of the material handling system, mixed packages onto a pallet to form a pallet load of mixed packages, the automated palletizer is communicably connected to the automated package transport system which provides individual packages from the storage array to the automated palletizer for forming the pallet load of mixed packages, the pallet load of mixed packages including more than one composite layers of mixed packages; and forming completely and stably, with a controller of the material handling system that is operably connected to the automated palletizer and programmed with a pallet load generator with an initial pallet load plan, the pallet load of mixed packages in mixed package layers in an initial planned pallet load distribution;

wherein:

the controller is communicably connected so as to register from at least one of the storage array and the automated package transport system at least one scratch package, wherein the pallet load generator is arranged to identify a corresponding pallet layer, of the scratch package, in the initial pallet load plan, and determine a corresponding void, formed by the scratch package, in the corresponding pallet layer; and the pallet load generator determines a measure of stability resultant from the corresponding void in the corresponding pallet layer and heuristically resolve the corresponding void based on optimization of the measure of stability to equal or exceed a predetermined threshold from at least one of:

repose, relative to the corresponding void, at least one adjacent package adjacent the corresponding void in the initial pallet load plan, and swapping, at least another package of the initial pallet load plan into the corresponding void for the scratch package; and the pallet load generator generates a pallet load re-plan for the automated palletizer as defined by resolution of each corresponding void for each scratch packages in the initial pallet load plan.

In accordance with one or more aspects of the present disclosure the repose of the at least one adjacent package closes the corresponding void at least in part.

In accordance with one or more aspects of the present disclosure, the predetermined threshold of the measure of stability characterizes the corresponding pallet layer with the resolved void as stable for automatic palletization.

In accordance with one or more aspects of the present disclosure, the predetermined threshold of the measure of stability characterizes resolution of the corresponding void to a resolved void, and reformation of the corresponding pallet layer, destabilized by the corresponding void, to a stable layer made stable by the resolved void.

In accordance with one or more aspects of the present disclosure, the stable layer defines a stable support, commensurate with each other stable layer of the pallet load re-plan, for automatic palletization of all superposed layers on the stable layer.

In accordance with one or more aspects of the present disclosure, the measure of stability is proportional to a containment radius disposed around a centroid of a package, within which containment radius all points belong to a bounding polygon of supports of the package formed by inferior packages on which the package is seated.

In accordance with one or more aspects of the present disclosure repose of the at least one adjacent package includes a horizontal translation of the at least one adjacent package at least partially into the corresponding void.

In accordance with one or more aspects of the present disclosure, the method further comprises, with the pallet load generator: horizontally translating the at least one adjacent package in a sequence of incremental pose translations; determining a measure of stability for each of the incremental pose translations of the at least one adjacent package; and selecting a pose of the at least one package, for the pallet load re-plan, corresponding to the incremental pose translation having the greatest measure of stability.

In accordance with one or more aspects of the present disclosure, the method further comprises, with the pallet load generator: horizontally translating more than one of the at least one adjacent package in respective sequences of incremental pose translations; determining a measure of stability for each combination of the respective incremental pose translations of the more than one of the at least one adjacent package; and selecting respective poses of the more than one of the at least one package, for the pallet load re-plan, corresponding to a combination of the respective incremental pose translations having the greatest measure of stability.

In accordance with one or more aspects of the present disclosure repose of the at least one adjacent package includes a rotation of the at least one adjacent package about a center of the at least one adjacent package from an initial rotational pose to a translated rotation pose.

In accordance with one or more aspects of the present disclosure, the method further comprises, with the pallet load generator: determining a measure of stability for the at least one package in both the initial rotational pose and the translated rotational pose; and selecting a pose of the at least one package, for the pallet load re-plan, corresponding to the one initial rotational pose and the translated rotational pose having the greatest measure of stability.

In accordance with one or more aspects of the present disclosure swapping the at least another package closes the corresponding void at least in part and creates another void corresponding to an initial position of the at least another package.

In accordance with one or more aspects of the present disclosure, the method further comprises, with the pallet load generator, resolving the other void based on optimization of the measure of stability to equal or exceed a predetermined threshold from at least one of: repose, relative to the other void, at least one adjacent package adjacent the other void in the initial pallet load plan, and swapping, at least another package of the initial pallet load plan into the other void for the swapped package.

In accordance with one or more aspects of the present disclosure the pallet load generator effects swapping the at least another package by placing at least another package within the corresponding void, wherein the at least another package and the scratch package belong to a common pallet load layer.

In accordance with one or more aspects of the present disclosure the pallet load generator effects swapping the at least another package by placing the at least another package from a superposed pallet load layer, relative to a pallet load layer of the scratch package, to within the corresponding void.

In accordance with one or more aspects of the present disclosure the scratch package and the at least another package are disposed in a common stack of packages, and the pallet load generator effects swapping the at least another package by lowering the at least another package within the common stack of packages into the corresponding void.

In accordance with one or more aspects of the present disclosure the pallet load generator horizontally translates the at least one adjacent package, in an adjacent stack of packages, at least partially into another void created within the common stack of packages by the lowering of the at least another package.

In accordance with one or more aspects of the present disclosure, the method further comprises placing, with another automated palletizer, mixed packages onto the pallet to form the pallet load of mixed packages, the another automated palletizer and the automated palletizer having overlapping access that spans at least a portion of a footprint of the pallet, where with the initial pallet load plan assigning the scratch package to the automated palletizer, heuristically resolving, with the pallet load generator, the corresponding void only from packages assigned in the initial pallet load plan to the automated palletizer; and with the initial pallet load plan assigning the scratch package to the another automated palletizer, heuristically resolving, with the pallet load generator, the corresponding void only from packages assigned in the initial pallet load plan to the another automated palletizer.

In accordance with one or more aspects of the present disclosure, a material handling system for handling and placing packages onto pallets destined for an order store is provided. The material handling system includes: a storage array with storage spaces for holding packages therein; an automated package transport system communicably connected to the storage array for storing packages within the storage spaces of the storage array and retrieving packages from the storage spaces of the storage array; an automated palletizer for placing mixed packages onto a pallet to form a pallet load of mixed packages, the automated palletizer is communicably connected to the automated package transport system which provides individual packages from the storage array to the automated palletizer for forming the pallet load of mixed packages, the pallet load of mixed packages including more than one composite layers of mixed packages; and a controller operably connected to the automated palletizer, the controller being programmed with a pallet load generator with an initial pallet load plan for forming, completely and stably, the pallet load of mixed packages in mixed package layers in an initial planned pallet load distribution. The controller is communicably connected so as to register from at least one of the storage array and the automated package transport system at least one scratch package, wherein the pallet load generator is arranged to identify a corresponding pallet layer, of the scratch package, in the initial pallet load plan, and determine a corresponding void, formed by the scratch package, in the corresponding pallet layer; and the pallet load generator is programmed with a meta-pose package resolver, for at least one adjacent package adjacent the corresponding void, that heuristically optimizes a measure of stability of the corresponding pallet layer from meta poses of the at least one adjacent package so that the measure of stability equals or exceeds a predetermined threshold and the corresponding void is resolved.

In accordance with one or more aspects of the present disclosure, the pallet load generator is configured so as to optimize the measure of stability of the corresponding pallet layer from both heuristic optimization via the meta-pose package resolver, and swapping, at least another package of the initial pallet load plan into the corresponding void for the scratch package; and the pallet load generator is configured to generate a pallet load re-plan for the automated palletizer as defined by resolution of each corresponding void for each scratch packages in the initial pallet load plan.

In accordance with one or more aspects of the present disclosure, the meta-pose package resolver effects repose, relative the corresponding void, of at least one adjacent package adjacent the corresponding void in the initial pallet load plan.

In accordance with one or more aspects of the present disclosure, the repose of the at least one adjacent package closes the corresponding void at least in part.

In accordance with one or more aspects of the present disclosure, repose of the at least one adjacent package includes a horizontal translation of the at least one adjacent package at least partially into the corresponding void.

In accordance with one or more aspects of the present disclosure, repose of the at least one adjacent package includes a rotation of the at least one adjacent package about a center of the at least one adjacent package from an initial rotational pose to a translated rotation pose.

In accordance with one or more aspects of the present disclosure, the pallet load generator is configured to effect swapping the at least another package by placing at least another package within the corresponding void, wherein the at least another package and the scratch package belong to a common pallet load layer.

In accordance with one or more aspects of the present disclosure, the pallet load generator is configured to effect swapping the at least another package by placing the at least another package from a superposed pallet load layer, relative to a pallet load layer of the scratch package, to within the corresponding void.

In accordance with one or more aspects of the present disclosure, the scratch package and the at least another package are disposed in a common stack of packages, and the pallet load generator is configured to effect swapping the at least another package by lowering the at least another package within the common stack of packages into the corresponding void.

In accordance with one or more aspects of the present disclosure, the pallet load generator is further configured to horizontally translate the at least one adjacent package, in an adjacent stack of packages, at least partially into another void created within the common stack of packages by the lowering of the at least another package.

In accordance with one or more aspects of the present disclosure, swapping the at least another package closes the corresponding void at least in part and creates another void corresponding to an initial position of the at least another package.

In accordance with one or more aspects of the present disclosure, the pallet load generator is configured to resolve the other void based on optimization of the measure of stability to equal or exceed a predetermined threshold from at least one of: repose, relative to the other void, at least one adjacent package adjacent the other void in the initial pallet load plan, and swapping, at least another package of the initial pallet load plan into the other void for the swapped package.

In accordance with one or more aspects of the present disclosure, the predetermined threshold of the measure of stability characterizes the corresponding pallet layer with the resolved void as stable for automatic palletization.

In accordance with one or more aspects of the present disclosure, the predetermined threshold of the measure of stability characterizes resolution of the corresponding void to a resolved void, and reformation of the corresponding pallet layer, destabilized by the corresponding void, to a stable layer made stable by the resolved void.

In accordance with one or more aspects of the present disclosure, the stable layer defines a stable support, commensurate with each other stable layer of the pallet load re-plan, for automatic palletization of all superposed layers on the stable layer.

In accordance with one or more aspects of the present disclosure, the measure of stability is proportional to a containment radius disposed around a centroid of a package, within which containment radius all points belong to a bounding polygon of supports of the package formed by inferior packages on which the package is seated.

In accordance with one or more aspects of the present disclosure, the pallet load generator is configured to: horizontally translate the at least one adjacent package in a sequence of incremental pose translations; determine a measure of stability for each of the incremental pose translations of the at least one adjacent package; and select a pose of the at least one package, for the pallet load re-plan, corresponding to the incremental pose translation having the greatest measure of stability.

In accordance with one or more aspects of the present disclosure, the pallet load generator is configured to: horizontally translate more than one of the at least one adjacent package in respective sequences of incremental pose translations; determine a measure of stability for each combination of the respective incremental pose translations of the more than one of the at least one adjacent package; and select respective poses of the more than one of the at least one package, for the pallet load re-plan, corresponding to a combination of the respective incremental pose translations having the greatest measure of stability.

In accordance with one or more aspects of the present disclosure, the pallet load generator is configured to: determine a measure of stability for the at least one package in both the initial rotational pose and the translated rotational pose; and select a pose of the at least one package, for the pallet load re-plan, corresponding to the one initial rotational pose and the translated rotational pose having the greatest measure of stability.

In accordance with one or more aspects of the present disclosure, the material handling system further includes: another automated palletizer for placing mixed packages onto the pallet to form the pallet load of mixed packages, the another automated palletizer and the automated palletizer having overlapping access that spans at least a portion of a footprint of the pallet; wherein the pallet load generator is configured to: with the initial pallet load plan assigning the scratch package to the automated palletizer, heuristically resolve the corresponding void only from packages assigned in the initial pallet load plan to the automated palletizer; and with the initial pallet load plan assigning the scratch package to the another automated palletizer, heuristically resolve the corresponding void only from packages assigned in the initial pallet load plan to the another automated palletizer.

It should be understood that the foregoing description is only illustrative of the aspects of the present disclosure. Various alternatives and modifications can be devised by those skilled in the art without departing from the aspects of the present disclosure. Accordingly, the aspects of the present disclosure are intended to embrace all such alternatives, modifications and variances that fall within the scope of any claims appended hereto. Further, the mere fact that different features are recited in mutually different dependent or independent claims does not indicate that a combination of these features cannot be advantageously used, such a combination remaining within the scope of the aspects of the present disclosure.

What is claimed is:

1. A material handling system for handling and placing packages onto pallets destined for an order store, the material handling system comprising:
   a storage array with storage spaces for holding packages therein;
   an automated package transport system communicably connected to the storage array for storing packages within the storage spaces of the storage array and retrieving packages from the storage spaces of the storage array;
   an automated palletizer for placing mixed packages onto a pallet to form a pallet load of mixed packages, the automated palletizer is communicably connected to the automated package transport system which provides individual packages from the storage array to the automated palletizer for forming the pallet load of mixed packages, the pallet load of mixed packages including more than one composite layers of mixed packages; and
   a controller operably connected to the automated palletizer, the controller being programmed with a pallet load generator with an initial pallet load plan for forming, completely and stably, the pallet load of mixed packages in mixed package layers in an initial planned pallet load distribution;
   wherein:
   the controller is communicably connected so as to register from at least one of the storage array and the automated package transport system at least one scratch package, wherein the pallet load generator is arranged to identify a corresponding pallet layer, of the scratch package, in the initial pallet load plan, and determine a corresponding void, formed by the scratch package, in the corresponding pallet layer; and
   the pallet load generator is configured to determine a measure of stability resultant from the corresponding void in the corresponding pallet layer and heuristically resolve the corresponding void, based on optimization of the measure of stability to equal or exceed a predetermined threshold, from at least one of:
   repose, relative to the corresponding void, at least one adjacent package adjacent the corresponding void in the initial pallet load plan, and
   swapping, at least another package of the initial pallet load plan into the corresponding void for the scratch package; and
   the pallet load generator is configured to generate a pallet load re-plan for the automated palletizer as defined by resolution of each corresponding void for each scratch packages in the initial pallet load plan.

2. The material handling system of claim 1, wherein the repose of the at least one adjacent package closes the corresponding void at least in part.

3. The material handling system of claim 1, wherein the predetermined threshold of the measure of stability characterizes the corresponding pallet layer with the resolved void as stable for automatic palletization.

4. The material handling system of claim 1, wherein the predetermined threshold of the measure of stability characterizes resolution of the corresponding void to a resolved void, and reformation of the corresponding pallet layer, destabilized by the corresponding void, to a stable layer made stable by the resolved void.

5. The material handling system of claim 4, wherein the stable layer defines a stable support, commensurate with each other stable layer of the pallet load re-plan, for automatic palletization of all superposed layers on the stable layer.

6. The material handling system of claim 1, wherein the measure of stability is proportional to a containment radius disposed around a centroid of a package, within which containment radius all points belong to a bounding polygon of supports of the package formed by inferior packages on which the package is seated.

7. The material handling system of claim 1, wherein repose of the at least one adjacent package includes a horizontal translation of the at least one adjacent package at least partially into the corresponding void.

8. The material handling system of claim 1, wherein the pallet load generator is configured to:
   horizontally translate the at least one adjacent package in a sequence of incremental pose translations;
   determine a measure of stability for each of the incremental pose translations of the at least one adjacent package; and
   select a pose of the at least one package, for the pallet load re-plan, corresponding to the incremental pose translation having the greatest measure of stability.

9. The material handling system of claim 1, wherein the pallet load generator is configured to:
   horizontally translate more than one of the at least one adjacent package in respective sequences of incremental pose translations;
   determine a measure of stability for each combination of the respective incremental pose translations of the more than one of the at least one adjacent package; and
   select respective poses of the more than one of the at least one package, for the pallet load re-plan, corresponding to a combination of the respective incremental pose translations having the greatest measure of stability.

10. The material handling system of claim 1, wherein repose of the at least one adjacent package includes a rotation of the at least one adjacent package about a center of the at least one adjacent package from an initial rotational pose to a translated rotation pose.

11. The material handling system of claim 10, wherein the pallet load generator is configured to:
    determine a measure of stability for the at least one package in both the initial rotational pose and the translated rotational pose; and
    select a pose of the at least one package, for the pallet load re-plan, corresponding to the one initial rotational pose and the translated rotational pose having the greatest measure of stability.

12. The material handling system of claim 1, wherein swapping the at least another package closes the corresponding void at least in part and creates another void corresponding to an initial position of the at least another package.

13. The material handling system of claim 12, wherein the pallet load generator is configured to resolve the other void, based on optimization of the measure of stability to equal or exceed a predetermined threshold, from at least one of:
    repose, relative to the other void, at least one adjacent package adjacent the other void in the initial pallet load plan, and
    swapping, at least another package of the initial pallet load plan into the other void for the swapped package.

14. The material handling system of claim 1, wherein the pallet load generator is configured to effect swapping the at least another package by placing at least another package within the corresponding void, wherein the at least another package and the scratch package belong to a common pallet load layer.

15. The material handling system of claim 1, wherein the pallet load generator is configured to effect swapping the at least another package by placing the at least another package from a superposed pallet load layer, relative to a pallet load layer of the scratch package, to within the corresponding void.

16. The material handling system of claim 1, wherein the scratch package and the at least another package are disposed in a common stack of packages, and the pallet load generator is configured to effect swapping the at least another package by lowering the at least another package within the common stack of packages into the corresponding void.

17. The material handling system of claim 16, wherein the pallet load generator is further configured to horizontally translate the at least one adjacent package, in an adjacent stack of packages, at least partially into another void created within the common stack of packages by the lowering of the at least another package.

18. The material handling system of claim 1, wherein the automated palletizer comprises:
    a first arm and a second arm configured for placing mixed packages onto the pallet to form the pallet load of mixed packages, the first arm and the second arm having overlapping access that spans at least a portion of a footprint of the pallet;
    wherein the pallet load generator is configured to:
    with the initial pallet load plan assigning the scratch package to the first arm, heuristically resolve the corresponding void only from packages assigned in the initial pallet load plan to the first arm; and
    with the initial pallet load plan assigning the scratch package to the second arm, heuristically resolve the corresponding void only from packages assigned in the initial pallet load plan to the second arm.

19. A method for handling and placing packages onto pallets destined for an order store, the method comprising:
    providing a storage array, of a material handling system, with storage spaces for holding packages therein;
    storing packages within the storage spaces of the storage array and retrieving packages from the storage spaces of the storage array with an automated package transport system, of the material handling system, that is communicably connected to the storage array;
    placing, with an automated palletizer of the material handling system, mixed packages onto a pallet to form a pallet load of mixed packages, the automated palletizer is communicably connected to the automated package transport system which provides individual packages from the storage array to the automated palletizer for forming the pallet load of mixed packages, the pallet load of mixed packages including more than one composite layers of mixed packages; and
    forming completely and stably, with a controller of the material handling system that is operably connected to the automated palletizer and programmed with a pallet load generator with an initial pallet load plan, the pallet load of mixed packages in mixed package layers in an initial planned pallet load distribution;
    wherein:
    the controller is communicably connected so as to register from at least one of the storage array and the automated package transport system at least one scratch package, wherein the pallet load generator is arranged to identify a corresponding pallet layer, of the scratch package, in the initial pallet load plan, and determine a corresponding void, formed by the scratch package, in the corresponding pallet layer; and the pallet load generator determines a measure of stability resultant from the corresponding void in the corresponding pallet layer and heuristically resolve the corresponding void, based on optimization of the measure of stability to equal or exceed a predetermined threshold, from at least one of:

repose, relative to the corresponding void, at least one adjacent package adjacent the corresponding void in the initial pallet load plan, and swapping, at least another package of the initial pallet load plan into the corresponding void for the scratch package; and the pallet load generator generates a pallet load re-plan for the automated palletizer as defined by resolution of each corresponding void for each scratch packages in the initial pallet load plan.

20. The method of claim 19, wherein the repose of the at least one adjacent package closes the corresponding void at least in part.

21. The method of claim 19, wherein the predetermined threshold of the measure of stability characterizes the corresponding pallet layer with the resolved void as stable for automatic palletization.

22. The method of claim 19, wherein the predetermined threshold of the measure of stability characterizes resolution of the corresponding void to a resolved void, and reformation of the corresponding pallet layer, destabilized by the corresponding void, to a stable layer made stable by the resolved void.

23. The method of claim 22, wherein the stable layer defines a stable support, commensurate with each other stable layer of the pallet load re-plan, for automatic palletization of all superposed layers on the stable layer.

24. The method of claim 19, wherein the measure of stability is proportional to a containment radius disposed around a centroid of a package, within which containment radius all points belong to a bounding polygon of supports of the package formed by inferior packages on which the package is seated.

25. The method of claim 19, wherein repose of the at least one adjacent package includes a horizontal translation of the at least one adjacent package at least partially into the corresponding void.

26. The method of claim 19, further comprising, with the pallet load generator:

horizontally translating the at least one adjacent package in a sequence of incremental pose translations;

determining a measure of stability for each of the incremental pose translations of the at least one adjacent package; and selecting a pose of the at least one package, for the pallet load re-plan, corresponding to the incremental pose translation having the greatest measure of stability.

27. The method of claim 19, further comprising, with the pallet load generator:

horizontally translating more than one of the at least one adjacent package in respective sequences of incremental pose translations;

determining a measure of stability for each combination of the respective incremental pose translations of the more than one of the at least one adjacent package; and selecting respective poses of the more than one of the at least one package, for the pallet load re-plan, corresponding to a combination of the respective incremental pose translations having the greatest measure of stability.

28. The method of claim 19, wherein repose of the at least one adjacent package includes a rotation of the at least one adjacent package about a center of the at least one adjacent package from an initial rotational pose to a translated rotation pose.

29. The method of claim 28, further comprising, with the pallet load generator:

determining a measure of stability for the at least one package in both the initial rotational pose and the translated rotational pose; and selecting a pose of the at least one package, for the pallet load re-plan, corresponding to the one initial rotational pose and the translated rotational pose having the greatest measure of stability.

30. The method of claim 19, wherein swapping the at least another package closes the corresponding void at least in part and creates another void corresponding to an initial position of the at least another package.

31. The method of claim 30, further comprising, with the pallet load generator, resolving the other void, based on optimization of the measure of stability to equal or exceed a predetermined threshold, from at least one of:

repose, relative to the other void, at least one adjacent package adjacent the other void in the initial pallet load plan, and swapping, at least another package of the initial pallet load plan into the other void for the swapped package.

32. The method of claim 19, wherein the pallet load generator effects swapping the at least another package by placing at least another package within the corresponding void, wherein the at least another package and the scratch package belong to a common pallet load layer.

33. The method of claim 19, wherein the pallet load generator effects swapping the at least another package by placing the at least another package from a superposed pallet load layer, relative to a pallet load layer of the scratch package, to within the corresponding void.

34. The method of claim 19, wherein the scratch package and the at least another package are disposed in a common stack of packages, and the pallet load generator effects swapping the at least another package by lowering the at least another package within the common stack of packages into the corresponding void.

35. The method of claim 34, wherein the pallet load generator horizontally translates the at least one adjacent package, in an adjacent stack of packages, at least partially into another void created within the common stack of packages by the lowering of the at least another package.

36. The method of claim 19, further comprising:

placing, with a second arm of the automated palletizer, mixed packages onto the pallet to form the pallet load of mixed packages, the second arm of the automated palletizer and a first arm of the automated palletizer having overlapping access that spans at least a portion of a footprint of the pallet;

wherein:

with the initial pallet load plan assigning the scratch package to the first arm, heuristically resolving, with the pallet load generator, the corresponding void only from packages assigned in the initial pallet load plan to the first arm; and with the initial pallet load plan assigning the scratch package to the second arm, heuristically resolving, with the pallet load generator, the corresponding void only from packages assigned in the initial pallet load plan to the second arm.

\* \* \* \* \*